United States Patent
Ohta

[11] Patent Number: 6,015,885
[45] Date of Patent: Jan. 18, 2000

[54] POLYAZO COMPOUND AND METHOD FOR DYEING OR TEXTILEPRINTING FIBER MATERIAL USING THE SAME

[75] Inventor: Yoshiteru Ohta, Ibaraki, Japan

[73] Assignee: Sumitomo Chemical Company, Limited, Osaka, Japan

[21] Appl. No.: 08/889,888

[22] Filed: Jul. 10, 1997

[30] Foreign Application Priority Data

| Jul. 11, 1996 | [JP] | Japan | 8-181830 |
| Oct. 11, 1996 | [JP] | Japan | 8-270168 |
| Dec. 26, 1996 | [JP] | Japan | 8-348937 |
| Jan. 21, 1997 | [JP] | Japan | 9-008690 |

[51] Int. Cl.[7] ......... C09B 62/09; C09B 62/513; C09B 62/03; D06P 1/38
[52] U.S. Cl. ......... 534/637; 534/642; 534/612; 534/633; 534/635
[58] Field of Search ......... 534/637, 642

[56] References Cited

U.S. PATENT DOCUMENTS

| 4,939,243 | 7/1990 | Meininger et al. | 534/625 |
| 5,686,584 | 11/1997 | Dietz et al. | 534/637 X |

FOREIGN PATENT DOCUMENTS

| 3519551 | 12/1986 | European Pat. Off. . | |
| 281898 | 9/1988 | European Pat. Off. | 534/629 |
| 0395951 | 4/1990 | European Pat. Off. . | |
| 0712905 | 11/1995 | European Pat. Off. . | |
| 1490447 | 6/1967 | France . | |
| 2634497 | 3/1978 | Germany | 534/625 |
| 3202120 | 7/1983 | Germany . | |
| 8-209016 | 8/1996 | Japan . | |

OTHER PUBLICATIONS

Chemical Abstracts, Chemical Substance Index, vol. 99, Part 3, p. 4277CS, 1983.

Chemical Abstracts, Chemical Substance Index, vol. 106, Part 3, p. 5213CS, 1987.

Chemical Abstracts, vol. 115, abstr No. 94411 (1991).

*Primary Examiner*—Fiona T. Powers
*Attorney, Agent, or Firm*—Stevens, Davis, Miller & Mosher, L.L.P.

[57] ABSTRACT

A polyazo compound represented by the following formula (I):

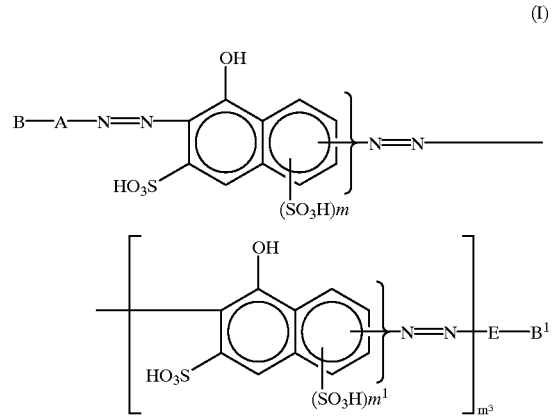

wherein

A represents unsubstituted phenylene or naphthylene;

E represents hydroxynaphthylene;

$m$, $m^1$ and $m^3$ independently represent an integer of 0 or 1;

B and B1 represents hydrogen atom, $-SO_2-Z$ in which Z represents $-CH=CH_2$ or $-CH_2CH_2Y$ in which Y represents a group eliminatable by an action of an alkali, or a substituted triazine group, etc.

11 Claims, No Drawings

POLYAZO COMPOUND AND METHOD FOR DYEING OR TEXTILEPRINTING FIBER MATERIAL USING THE SAME

FIELD OF THE INVENTION

The present invention relates to a novel polyazo compound and a salt thereof.

BACKGROUND OF THE INVENTION

As a dye for dyeing or textile printing a fiber material, for example, azo compounds having a vinyl sulfone reactive group have hitherto been known (e.g. JP-A-50-178, JP-A-63-77947, JP-A-6-287463).

However, even when these azo compounds are used for dyeing or textile printing fiber materials such as natural or regenerated cellulose fiber, they do not satisfy the reproducibility, levelness, color value, build-up properties, chlorine atom treated water fastness, tap water chlorine atom fastness, light fastness, perspiration light fastness, etc. Therefore, it has been desired to develop a dye which satisfies these performances. Also, it has strongly been desired to develop a dye which causes little discoloration at the time of various processing treatments; affords a dyed or textile-printed product having excellent storage stability; and exhibits high effective dyeing ratio capable of reducing a coloration of dyeing waste water with the recent increase of interest about environmental problems.

Under these circumstances, the present inventors have studied intensively for the purpose of obtaining a dye which is excellent in reproducibility and levelness, and exhibits high build up properties, high color value and high effective dyeing ratio in a dyeing and textile-printing treatment of fiber materials; and affords a dyed or textile-printed product which is excellent in fastnesses, particularly chlorine atom treated water fastness, tap water chlorine atom fastness, light fastness and perspiration light fastness, causes little discoloration at the time of various processing treatments, and exhibits excellent storage stability. As a result, it has been found that a specific polyazo compound or a salt thereof has desired performances. Thus, the present invention has been accomplished.

SUMMARY OF THE INVENTION

The present invention provides a polyazo compound represented by the following formula (I):

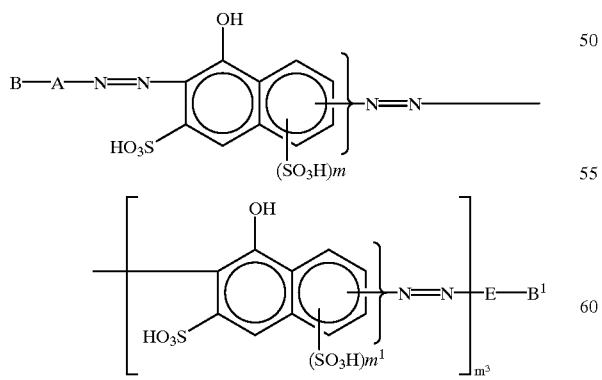

wherein

A represents unsubstituted phenylene, phenylene substituted with at least one non-reactive substituent, unsubstituted naphthylene or naphthylene substituted with at least one non-reactive substituent;

E represents unsubstituted hydroxynaphthylene, or hydroxynaphthylene substituted with at least one non-reactive substituent;

$m$, $m^1$ and $m^3$ independently represent an integer of 0 or 1;

B represents hydrogen atom, $-SO_2-Z$ in which Z represents $-CH=CH_2$ or $-CH_2CH_2Y$ in which Y represents a group eliminatable by the action of an alkali, or a group represented by the following formula (1), (2) or (3):

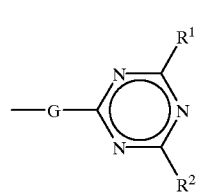

(1)

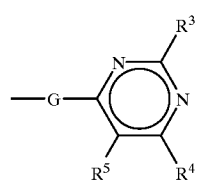

(2)

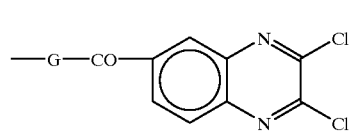

(3)

wherein

G represents a group represented by the following formula (4) or (5):

(4)

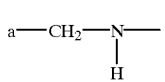

(5)

wherein

"a" represents to bond with A or E; and R represents hydrogen atom or optionally substituted lower alkyl;

$R^1$ represents a group represented by the following general formula (7), (8), (9) or (10):

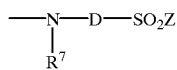  (7)

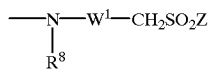  (8)

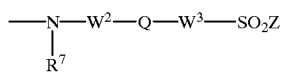  (9)

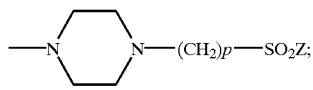  (10)

wherein
  $R^7$ represents hydrogen atom or optionally substituted lower alkyl;
  D represents optionally substituted phenylene or optionally substituted naphthylene;
  Z represents the same definition as above;
  $W^1$ represents optionally substituted straight-chain or branched lower alkylene;
  $R^8$ represents hydrogen atom, optionally substituted lower alkyl or —$W^1$—$CH_2SO_2Z$ in which $W^1$ and Z represent the same definition as above;
  $W^2$ and $W^3$ independently represent straight-chain or branched alkylene having 2 to 6 carbon atoms;
  Q represents —O— or —$NR^9$— in which $R^9$ represents hydrogen atom or lower alkyl; and
  p represents an integer of 1 to 6;
  $R^2$, which is same as or different from $R^1$, represents fluorine atom; chlorine atom; optionally substituted amino; —$OR^{10}$ or —$SR^{10}$, in which $R^{10}$ represents hydrogen atom, optionally substituted lower alkyl or optionally substituted phenyl;
  a group represented by the following formula (6):

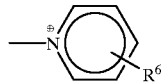  (6)

wherein
  $R^6$ represents hydrogen atom, lower alkyl, carbamoyl or carboxyl;
  or a group represented by the formula (7), (8), (9) or (10);
  $R^3$ and $R^4$ independently represent fluorine atom, chlorine atom or hydrogen atom; and
  $R^5$ represents hydrogen atom, fluorine atom, chlorine atom, cyano or lower alkyl;
and
  $B^1$, which is same as or different from B, represents hydrogen atom or a group represented by the formula (1), (2) or (3); provided that when B represents hydrogen atom, $B^1$ represents a group represented by the formula (1), (2) or (3); and when $B^1$ represents hydrogen atom, B represents —$SO_2$-Z in which Z represents the same definition as above or a group represented by the formula (1), (2) or (3);
or a salt of the polyazo compound represented by the formula (I).

The present invention also provides a method for dyeing or textile-printing a fiber material, using the polyazo compound represented by the formula (I).

The present invention will be explained in detail hereinafter.

DETAILED DESCRIPTION OF THE INVENTION

The group represented by B in the formula (I) is hydrogen atom, —$SO_2$-Z in which Z represents same meaning as above or group represented by the formula (1), (2) or (3). Among them, hydrogen atom, —$SO_2$-Z in which Z represents same meaning as above and a group represented by the formula (1) are preferred as B. Particularly, hydrogen atom and a group represented by the formula (1) are preferred as B. When $B^1$ is hydrogen atom, B represents —$SO_2$-Z in which Z represents same meaning as above or a group represented by the formula (1), (2) or (3).

The group represented by $B^1$ in the formula (I) is hydrogen atom or group represented by the formula (1), (2) or (3). Among them, hydrogen atom and a group represented by the formula (1) are preferred. When B represents hydrogen atom, $B^1$ represents a group represented by the formula (1), (2) or (3).

As a group represented by G in the formula (1), (2) or (3), a group of the formula (4) is preferred.

As the substituent $R^1$ of the formula (1), groups of the general formulas (7) and (8) are preferred.

As the substituent $R^2$ of the formula (1), fluorine atom, chlorine atom, groups of the general formulas (7) and (8) and amino groups represented by the following formulas (16) and (17):

  (16)

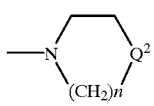  (17)

wherein
  $R^{15}$ represents hydrogen atom, cyano or optionally substituted lower alkyl;
  $R^{16}$ represents hydrogen atom, optionally substituted lower alkyl, optionally substituted phenyl, optionally substituted naphthyl or optionally substituted cycloalkyl having 5 to 7 carbon atoms in the cycloalkyl moiety;
  n represents 1 or 2; and
  $Q^2$ represents —O—, —S—, —$CH_2$—, —$SO_2$— or —$NR^{17}$ in which $R^{17}$ represents hydrogen atom or lower alkyl are preferred. Among them, a group represented by the formula (7), (8), (16) or (17) is preferred.

In the formula (I) representing the polyazo compound of the present invention, A represents optionally substituted phenylene or optionally substituted naphthylene. Examples of the optionally substituted phenylene include unsubstituted phenylene, phenylene substituted with 1, 2 or 3 substituents selected from the group consisting of methyl, ethyl, methoxy, ethoxy, chloro, bromo, carboxy, nitro, acylamino preferably having 1 to 4 carbon atoms, sulfo and a group represented by the following general formula (18) or (19):

wherein $R^{18}$ represents optionally substituted lower alkyl, optionally substituted phenyl or optionally substituted naphthyl.

Examples of the phenyl group represented by "-A-B" in the formula (I) include the following groups:

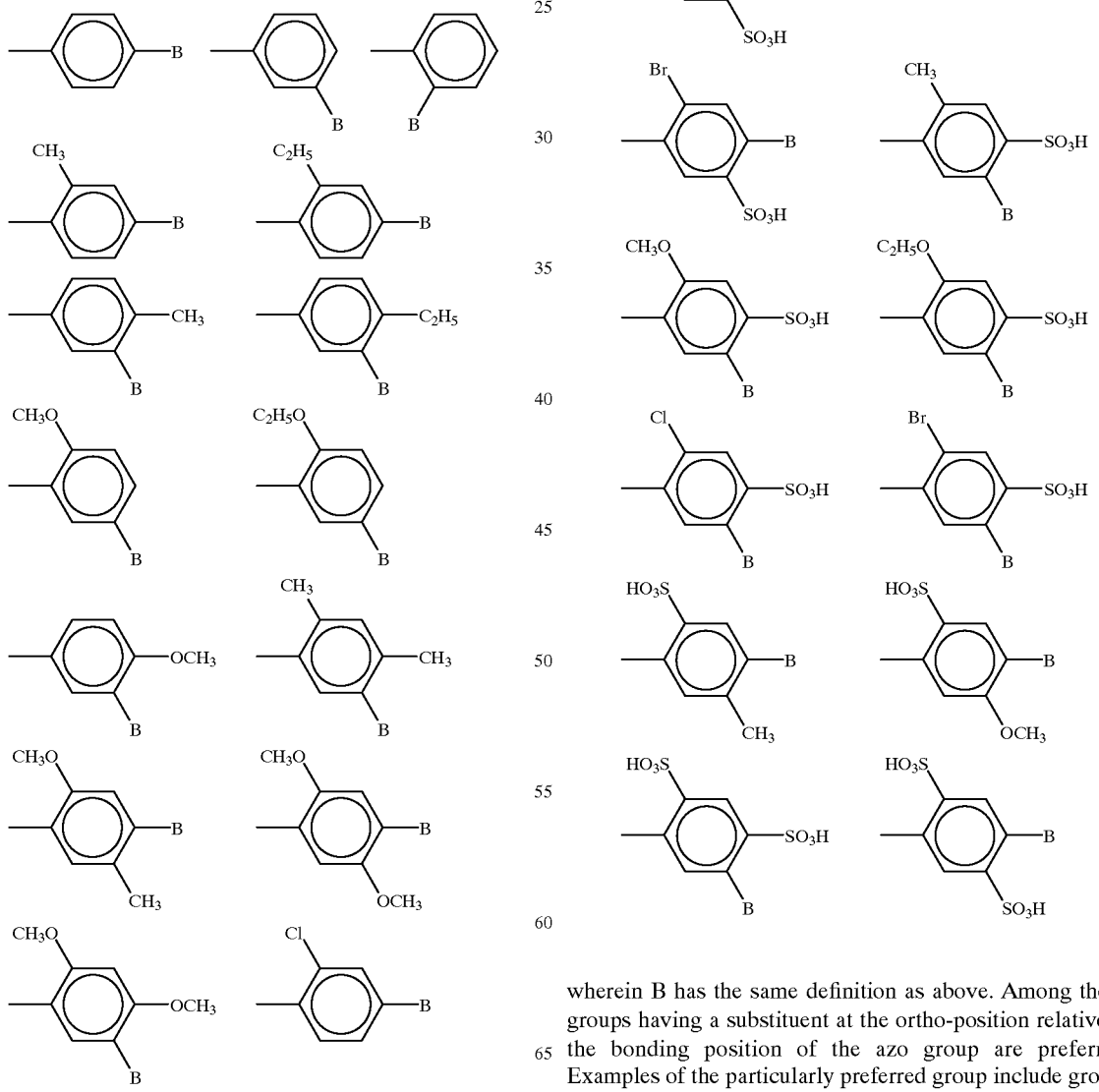

wherein B has the same definition as above. Among them, groups having a substituent at the ortho-position relative to the bonding position of the azo group are preferred. Examples of the particularly preferred group include groups represented by the following formulas:

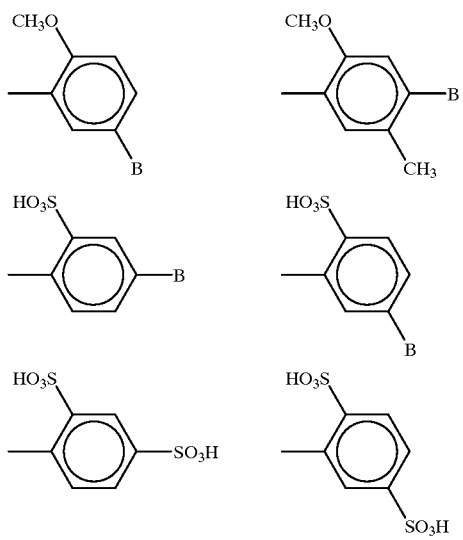

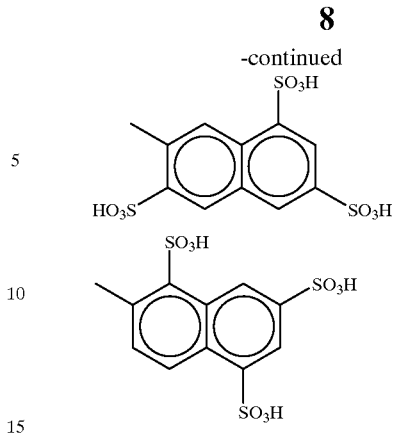

wherein B has the same definition as above.

Examples of the optionally substituted naphthylene represented by A in the formula (I) include unsubstituted naphthylene or naphthylene substituted with 1, 2 or 3 sulfo groups.

Specific examples of the naphthyl group represented by -A-B in the formula (I) include groups represented by the following formulas:

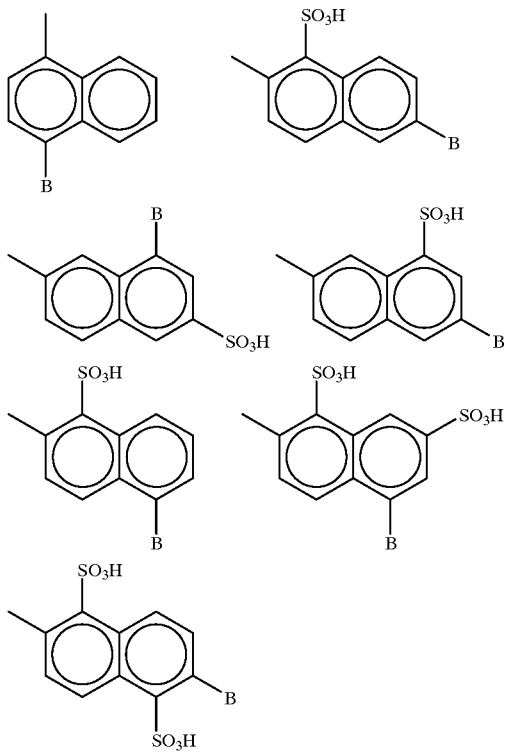

-continued

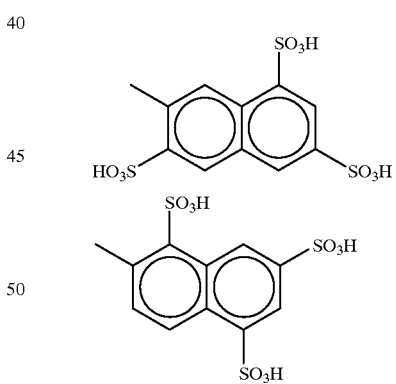

wherein B has the same definition as above. Among them, groups having a substituent at the ortho-position relative to the bonding position of an azo group are preferred. Particularly preferred are groups represented by the following formulas:

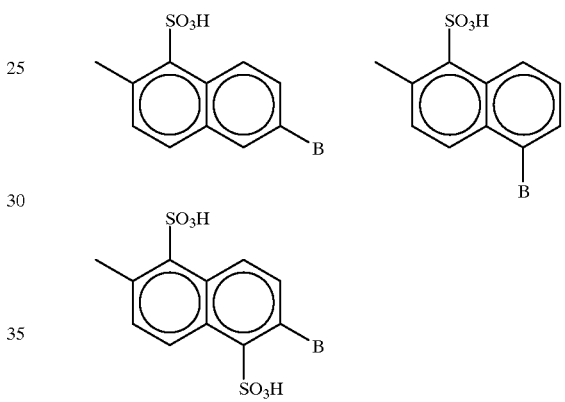

wherein B has the same definition as above.

Examples of the optionally substituted hydroxynaphthylene represented by E in the formula (I) include unsubstituted hydroxynaphthylene and hydroxynaphthylene substituted with substituents selected from 1, 2 or 3 sulfo groups, a group represented by the formula (18) or a group represented by the formula (19). As the substituent of hydroxynaphthylene represented by E, 1, 2 or 3 sulfo groups and a group represented by the formula (18) are preferred.

Preferred examples of the group represented by "-E-B¹" in the formula (I) include groups represented by the following formulas:

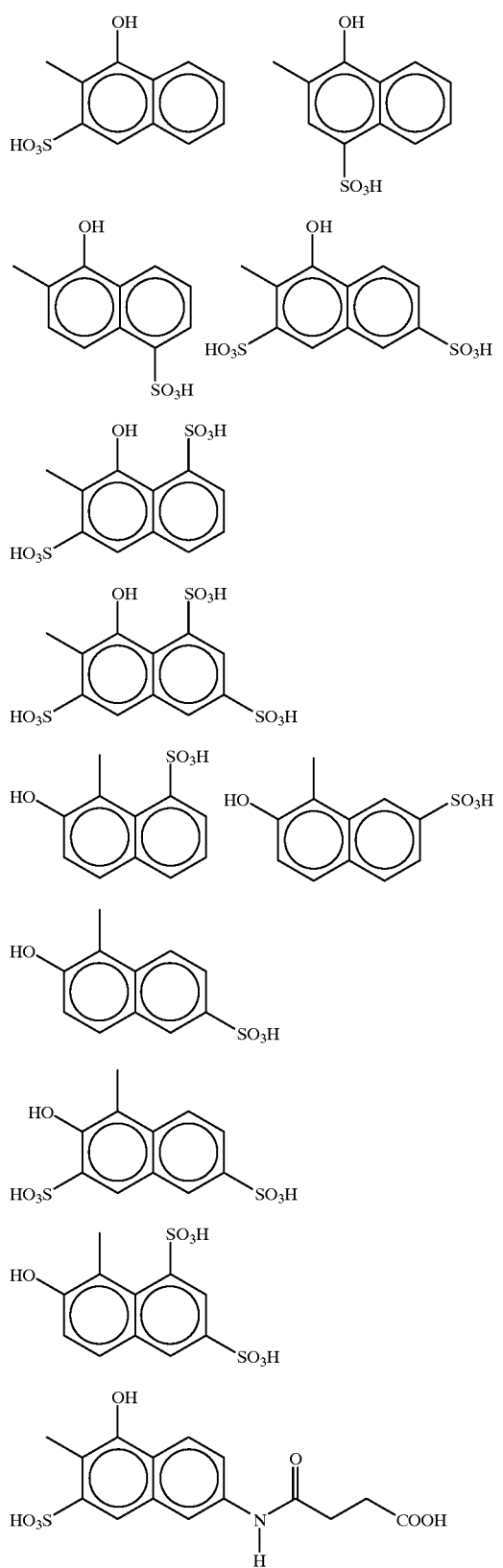
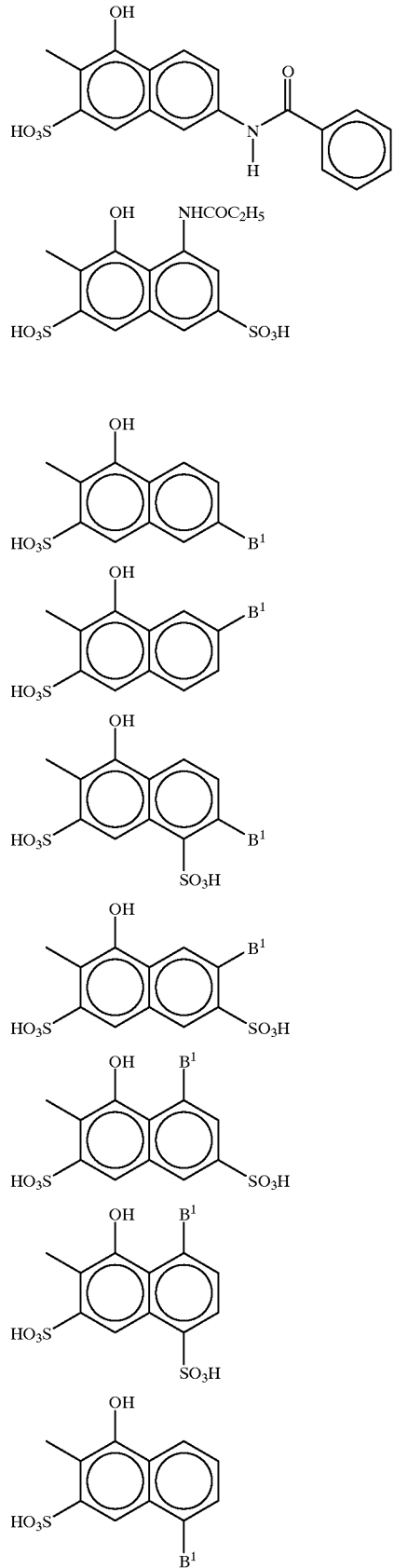

wherein B¹ has the same definition as above.

Among them, groups represented by the following formulas:

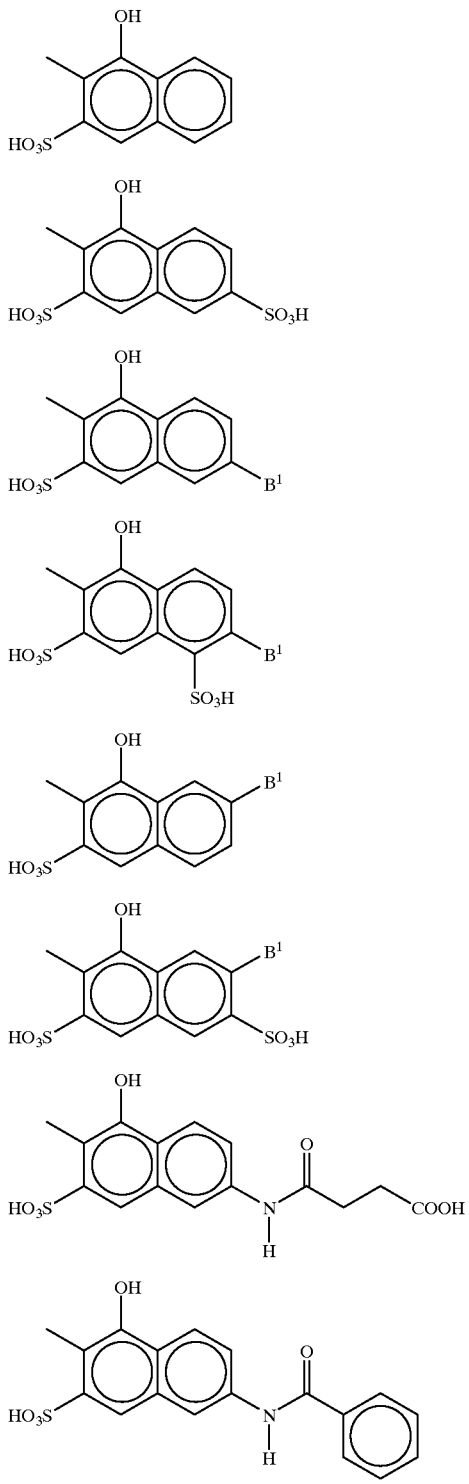

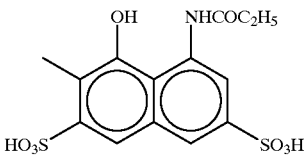

wherein B¹ has the same definition as above are particularly preferred.

The group represented by R in the formula (4) representing G is hydrogen atom or optionally substituted lower alkyl. The optionally substituted lower alkyl represented by R is, for example, alkyl having 1 to 4 carbon atoms in the alkyl moiety. Examples of the substituent on the alkyl represented by R include hydroxy, cyano, alkoxy preferably having 1 to 4 carbon atoms, halogeno, carbamoyl, carboxy, alkoxycarbonyl preferably having 1 to 4 carbon atoms in the alkoxy moiety, alkylcarbonyloxy preferably having 1 to 4 carbon atoms in the alkyl moiety, sulfo and sulfamoyl.

Specific examples of the alkyl represented by R include methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

As R, hydrogen atom, methyl or ethyl is preferred. Among them, hydrogen atom is particularly preferred.

D in the formula (7) represents optionally substituted phenylene or optionally substituted naphthylene Examples of the phenylene represented by D include unsubstituted phenylene or phenylene substituted with 1 or 2 substituents selected from the group consisting of methyl, ethyl, methoxy, ethoxy, chloro, bromo and sulfo. Specific examples thereof include:

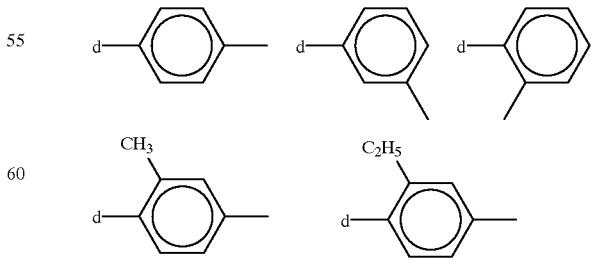

-continued

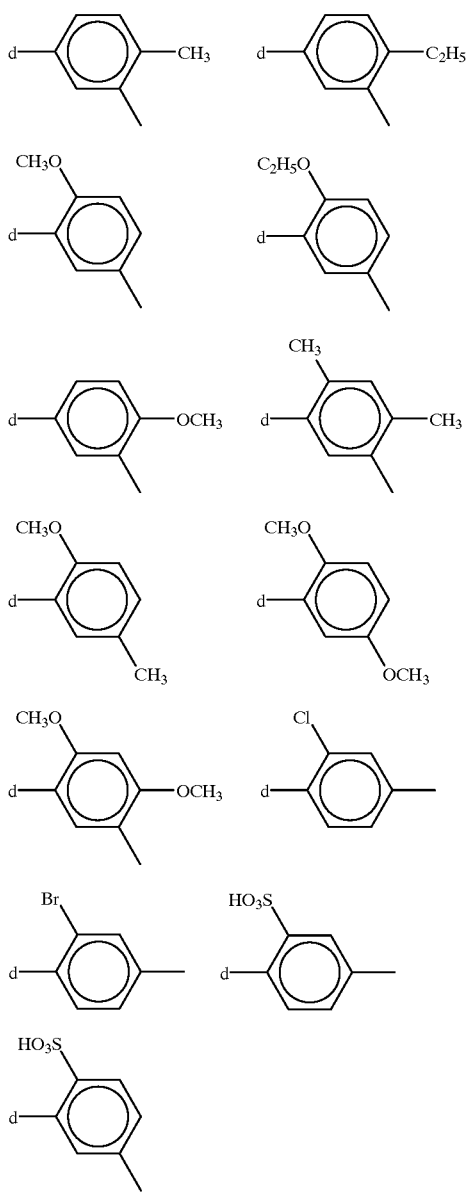

wherein a bond represented by "d" indicates a bond attached to nitrogen atom. Among them, groups represented by the following formulas:

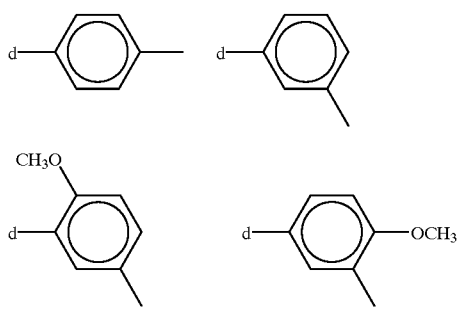

-continued

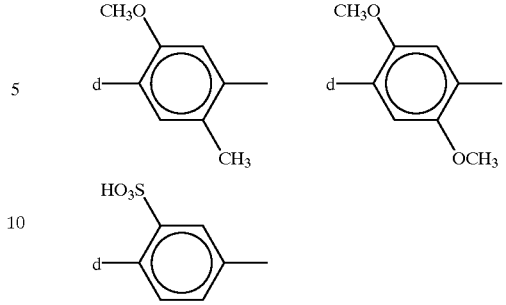

wherein d has the same definition as above are preferred. Particularly preferred groups are groups represented by the following formulas:

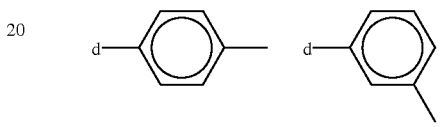

wherein d has the same definition as above.

Examples of the optionally substituted naphthylene represented by D include unsubstituted naphthylene and naphthylene substituted with 1 or 2 sulfo groups. Specific examples thereof include those represented by the following formulas:

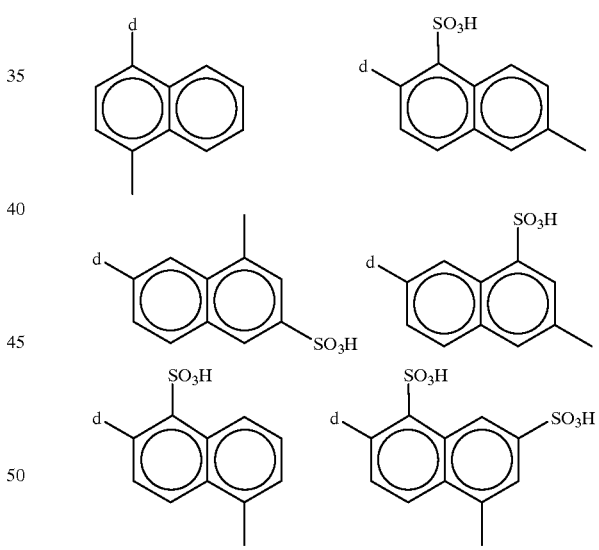

wherein d has the same definition as above. Among them, groups represented by the following formulas:

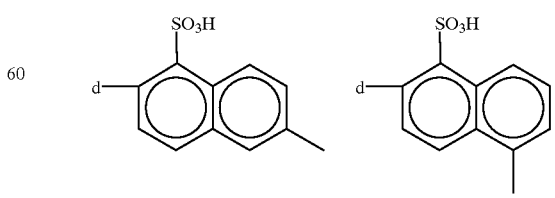

wherein d has the same definition as above are preferred.

In the formula (6), $R^6$ represents hydrogen atom, lower alkyl, carbamoyl or carboxyl. Specific examples of the lower alkyl represented $R^6$ include an alkyl group having 1–4 carbon atom, such as methyl, ethyl, n-propyl, isopropyl, n-butyl iso-butyl and sec-butyl.

As $R^6$, hydrogen atom, carbamoyl and carboxyl are preferred. Among them, carboxyl is particularly preferred.

In the formula (7), $R^7$ represents hydrogen atom or optionally substituted lower alkyl. Specific examples of the lower alkyl represented $R^7$ include those exemplified above as examples of lower alkyl represented by R in the formula (4). As $R^7$, hydrogen atom, methyl and ethyl are preferred. Among them, hydrogen atom is particularly preferred.

$W^1$ in the formula (8) represents optionally substituted lower alkylene. Examples of the lower alkylene represented by $W^1$ include straight-chain or branched alkylene having 1 to 5 carbon atoms in the alkylene moiety. Specific examples thereof include methylene, ethylene, methylmethylene, trimethylene and tetramethylene. Examples of the substituent of the lower alkylene include halogeno, hydroxy, sulfate, carboxy, cyano, lower alkylcarbonyloxy, lower alkoxycarbonyl, carbamoyl, and $-SO_2Z$ (wherein Z has the same definition as above).

Examples of the alkyl in the lower alkylcarbonyloxy a substituent on the alkylene represented by $W^1$, include alkyl having 1 to 4 carbon atoms, such as methyl, ethyl, n-propyl, isopropyl, n-butyl, isobutyl and sec-butyl. Examples of the alkoxy in the lower alkoxycarbonyl, a substituent on the alkylene represented by $W^1$, include alkoxy having 1 to 4 carbon atoms, such as methoxy, ethoxy, n-propoxy, isopropoxy, n-butoxy, isobutoxy and sec-butoxy.

Examples of the preferred group for $W^1$ include methylene, ethylene, methylmethylene, trimethylene and tetramethylene. Among them, methylene and ethylene are particularly preferred.

$R^8$ in the general formula (8) represents hydrogen atom, optionally substituted lower alkyl and a group represented by $-W^1-CH_2SO_2Z$ (wherein $W^1$ and Z have the same definitions as above). Specific examples of the optionally substituted lower alkyl represented by $R^8$ include those exemplified above as examples of lower alkyl represented by R in the formula (4).

As $R^8$, hydrogen atom, methyl and ethyl are preferred. Among them, hydrogen atom is particularly preferred.

$W^2$ and $W^3$ in the formula (9) represent straight chain or branched alkylene having 2 to 6 carbon atoms. Specific examples of the lower alkylene represented by $W^2$ or $W^3$ in the formula (9) include ethylene, methylmethylene, trimethylene and tetramethylene.

Among them, ethylene is preferred.

In the general formula (9), Q represents —O— or —$NR^9$ in which $R^9$ represents hydrogen atom or lower alkyl. Specific examples of the lower alkyl represented by $R^9$ include alkyl having 1 to 4 carbon atoms, such as methyl, ethyl, n-propyl, isopropyl, n-butyl, isobutyl and sec-butyl.

Among them, —O— and —NH— are preferred, and —O— is particularly preferred.

In the formula (10), p represents an integer of 1 to 6. As "p", the integer, 2, 3 or 4 is preferred.

Z in the general formulas (7), (8), (9) and (10) represents $-CH=CH_2$ or $-CH_2CH_2Y$ in which Y represents a group which is eliminatable by an action of an alkali. Examples of the group represented by Y include sulfate, thiosulfate, phosphate, acetate and halogeno. Among them, chloro or sulfate is particularly preferred. Preferred examples of Z include groups such as $-CH=CH_2$, $-CH_2CH_2Cl$ and $-CH_2CH_2OSO_3H$.

$R^2$ in the formula (1) may be amino. Examples of the amino represented by $R^2$ include those represented by the formulas (16) and (17).

$R^{15}$ in the general formula (16) represents hydrogen atom, cyano or optionally substituted lower alkyl. Specific examples of the lower alkyl represented by $R^{15}$ include those exemplified above as examples for lower alkyl represented by R in the formula (4). Preferred examples of the group represented by $R^{15}$ include alkyl having 1 to 4 carbon atoms which is unsubstituted or substituted with alkoxy having 1 to 4 carbon atoms, sulfo, carboxy, hydroxy or sulfate. Among them, methyl, ethyl, n-propyl, iso-propyl, n-butyl, iso-butyl, sec-butyl, β-hydroxyethyl, β-sulfate ethyl, β-sulfo ethyl, β-methoxyethyl and β-carboxyethyl are particularly preferred.

$R^{16}$ in the general formula (16) represents hydrogen atom, optionally substituted lower alkyl, optionally substituted phenyl, optionally substituted naphthyl or optionally substituted cycloalkyl having 5 to 7 carbon atoms in the cycloalkyl moiety. Specific examples of the lower alkyl include those exemplified above as examples of lower alkyl represented by R in the formula (4).

Examples of the optionally substituted phenyl represented by $R^{16}$ in the formula (16) include unsubstituted phenyl and phenyl substituted with 1, 2 or 3 substituents selected from the group consisting of sulfo, halogeno, lower alkyl, lower alkoxy, carboxy and nitro.

Specific examples of the lower alkyl, the substituent on the phenyl represented by $R^{16}$, include alkyl having 1 to 4 carbon atoms, such as methyl, ethyl, n-propyl, iso-propyl, n-butyl, iso-butyl and sec-butyl. Specific examples of the lower alkoxy, the substituent on the phenyl represented by $R^{16}$, include alkoxy having 1 to 4 carbon atoms, such as methoxy, ethoxy, n-propoxy, iso-propoxy, n-butoxy, iso-butoxy and sec-butoxy.

Preferred examples of the optionally substituted phenyl represented by $R^{16}$ include phenyl, 2-, 3- or 4-sulfophenyl, 2,4- or 2,5-disulfophenyl, 2-, 3- or 4-carboxyphenyl, 2-, 3- or 4-chlorophenyl, 2-, 3- or 4-methylphenyl, 2-, 3- or 4-methoxyphenyl, 2-carboxy-4- or 5-sulfophenyl, 2-sulfo-4- or 5-methylphenyl, 2-sulfo-4- or 5-methoxyphenyl, 2-methyl-4- or 5-sulfophenyl and 2-methoxy-4- or 5-sulfophenyl.

The optionally substituted naphthyl represented by $R^{16}$ is, for example, naphthyl which is unsubstituted or substituted with 1, 2 or 3 sulfo groups.

The optionally substituted cycloalkyl having 5 to 7 carbon atoms represented by $R^{16}$ is, for example, cycloalkyl which is unsubstituted or substituted with methyl, ethyl, fluorine atom, chlorine atom or hydroxy.

In the general formula (16), when $R^{16}$ is optionally substituted phenyl, $R^{15}$ is preferably hydrogen, methyl or ethyl. When $R^{16}$ is optionally substituted naphthyl, $R^{16}$ is preferably hydrogen.

$Q^2$ in the general formula (17) represents —O—, —S—, —$CH_2$—, —$SO_2$— or —$NR^{17}$— in which $R^{17}$ represents hydrogen atom or lower alkyl. Specific examples of the lower alkyl represented by $R^{17}$ include lower alkyl having 1 to 4 carbon atoms, such as methyl, ethyl, n-propyl, isopropyl, n-butyl, isobutyl and sec-butyl.

In the general formula (17), n is preferably 2 and $Q^2$ is preferably —$CH_2$— or —O—.

Examples of the group, B or $B^1$, represented by the general formula (2) include groups represented by the following formulas:

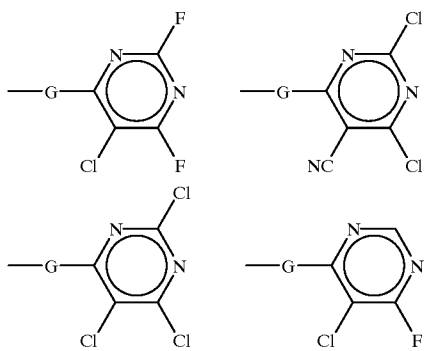

wherein G has the same definition as above. The lower alkyl group represented by $R^5$ in formula (2) preferably has 1 to 4 carbon atoms.

$R^2$ in the formula (1) may be a group represented by —$OR^{10}$ or —$SR^{10}$ in which $R^{10}$ represents hydrogen atom, optionally substituted lower alkyl or optionally substituted phenyl. Specific examples of the lower alkyl group represented by $R^{10}$ include same optionally substituted lower alkyl groups to those exemplified above as examples of lower alkyl represented by R in the formula (4).

Examples of the optionally substituted phenyl represented by $R^{10}$ is phenyl which is unsubstituted or substituted with 1, 2 or 3 substituents selected from the group consisting of sulfo, halogeno, lower alkyl, lower alkoxy, carboxy and nitro.

Specific examples of the lower alkyl, the substituent on the phenyl represented by $R^{10}$, include alkyl having 1 to 4 carbon atoms, such as methyl, ethyl, n-propyl, iso-propyl, n-butyl, iso-butyl and sec-butyl. Specific examples of the lower alkoxy, the substituent on the phenyl represented by $R^{10}$, include alkoxy having 1 to 4 carbon atoms, such as methoxy, ethoxy, n-propoxy, iso-propoxy, n-butoxy, iso-butoxy and sec-butoxy.

$R^{18}$ in the formula (18) and (19) represents optionally substituted lower alkyl, optionally substituted phenyl or optionally substituted naphthyl. Specific examples of the lower alkyl include optionally substituted lower alkyl having 1 to 4 carbon atoms which is the same as those described above as examples for R in the general formula (4).

As the lower alkyl represented by $R^{19}$, methyl, ethyl or 2-carboxyethyl are preferred.

Examples of the optionally substituted phenyl represented by $R^{18}$ include phenyl which is unsubstituted or substituted with 1, 2 or 3 substituents selected from the group consisting of sulfo, halogeno, lower alkyl preferably having 1 to 4 carbon atoms, lower alkoxy preferably having 1 to 4 carbon atoms, carboxy and nitro.

Examples of the optionally substituted naphthyl represented by $R^{18}$ include naphthyl which is unsubstituted or substituted with 1, 2 or 3 sulfo groups.

In the general formula (I), $m^3$ is preferably 0.

The polyazo compound represented by the formula (I) of the present invention can be produced in the following manner.

When $m^3$ is 1, the manner is as follows:

A compound represented by the following formula (II):

(II)

wherein A and B have the same definitions as above, or a salt thereof is diazotized; and then the diazotized compound is diazo-coupled with a compound represented by the following formula (III):

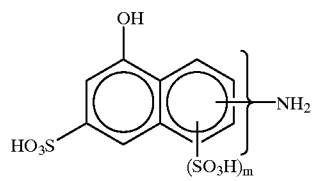

(III)

wherein m has the same definition as above, or a salt thereof to obtain a compound represented by the following formula (III-1):

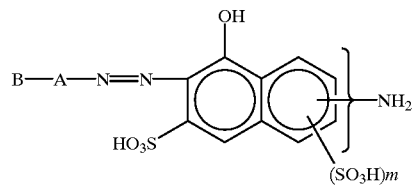

(III-1)

wherein A, B and m have the same definitions as above, or a salt thereof.

The compound thus obtained, i.e. Compound (III-1) or its salt, is diazotized; and, then, the diazotized compound is diazo-coupled with a compound represented by the following formula (III-2):

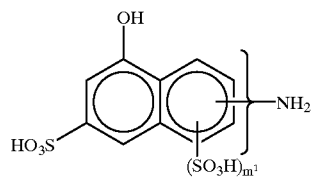

(III-2)

wherein $m^1$ has the same definition as above, or a salt thereof to obtain a compound represented by the following formula (IV):

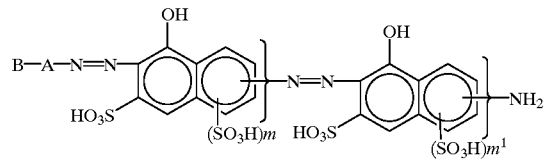

(IV)

wherein A, B, m and $m^1$ have the same definitions as above, or a salt thereof.

Thereafter, the compound thus obtained, i.e. Compound (IV) or its salt, is diazotized; and, then, the diazotized compound is diazo-coupled with a compound represented by the following general formula (V);

 (V)

wherein E and $B^1$ have the same definitions as above, or a salt thereof to obtain a polyazo compound represented by the formula (I) or a salt thereof of the present invention.

When $m^3$ is 0, the polyazo compound of the present invention can be produced by diazotizing a compound represented by the formula (III-1) or a salt thereof, followed by diazo-coupling the diazotized compound with a compound represented by the formula (V).

When B is a group represented by the formula (1), the amino compound of the formula (II) can be obtained by condensing a compound represented by the following general formula (VI):

R¹—H   (VI)

wherein $R^1$ has the same definition as above, a compound represented by the following formula (VII):

R²'—H   (VII)

wherein $R^{2'}$ has the same definition as $R^2$ mentioned above except for excluding fluorine atom and chlorine atom, and a compound represented by the following general formula (VIII):

H₂N-A-G-H   (VIII)

wherein A and G have the same definitions as above with a 2,4,6-trihalogeno-s-triazine in any order.

In the condensation reaction between the above compounds and 2,4,6-trihalogeno-s-triazine, the order is not specifically limited and the reaction conditions are not specifically limited either, although the first condensation, i.e. the condensation reaction with unsubstituted 2,4,6-trihalogeno-s-triazine is preferably carried out at the temperature of −10 to 40° C. and pH 2–9, the second condensation, i.e. the condensation reaction with the dihalogeno-s-triazine obtained in the first condensation, is preferably carried out at the temperature of 0 to 70° C. and pH 2–9, and the third condensation, i.e. the condensation reaction with the halogeno-s-triazine obtained in the second condensation, is preferably carried out the temperature of 10 to 100° C. and pH 2–7.

When B represent a group of formula (1) in which $R^2$ represent halogen, the compound represented by the general formula (II) can be obtained by omitting the third condensation according to the above synthesis method.

When B is a group represented by the general formula (2), the compound represented by the general formula (II) can be obtained by condensing a compound represented by the formula (VIII) with a compound represented by the following general formula (IX):

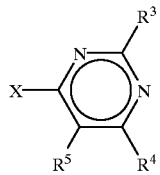

(IX)

wherein $R^3$, $R^4$ and $R^5$ have the same definitions as above, and X represents halogen atom.

When B is a group represented by the general formula (3), the compound represented by the general formula (II) can be obtained by condensing a compound represented by the formula (VIII) with a compound represented by the following formula (X):

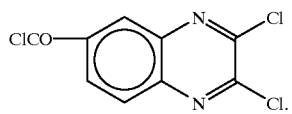

(X)

In the naphthol compound (V), when E is substituted with a group represented by the formula (18), a naphthol compound (V) can be produced by condensing a compound represented by the general formula (XI), (XVIII) or (XIX):

X¹—COR¹⁸   (XI)

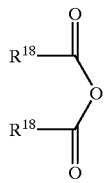

(XVIII)

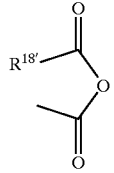

(XIX)

wherein $R^{18}$ has the same definition as above; $X^1$ represents halogen atom; and $R^{18'}$ represents alkylene such as ethylene, trimethylene or tetramethylene, and a divalent bonding group such as 1,2-phenylene with a compound represented by the following formula (XII):

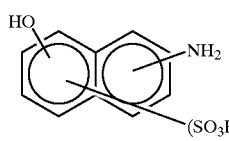

(XII)

wherein $m^2$ represents an integer of 0 to 3.

In the naphthol compound (V), when E is substituted with a group of the formula (19), a naphthol compound (V) can be obtained by condensing a compound represented by the following formula (XIII):

X¹—SO₂R¹⁸   (XIII)

wherein $X^1$ and $R^{18}$ have the same definitions as above, with a compound represented by the formula (XII).

Furthermore, in the naphthol compound (V), when $B^1$ is represented by the general formula (1), a naphthol compound (V) can be obtained by condensing compounds represented by the formulas (VI) and (VII) and a compound represented by the following formula (XVI):

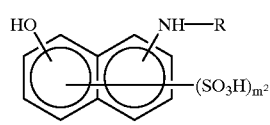

(XVI)

wherein m² and R have the same definitions as above, with a 2,4,6-trihalogeno-s-triazine in any order.

In the condensation reaction between the above compounds and 2,4,6-trihalogeno-s-triazine to obtain the compound of formula (V), the order is not specifically limited and the reaction conditions are not specifically limited either, although the first condensation is preferably carried out at the temperature of −10 to 40° C. and pH 2–9, the second condensation is preferably carried out at the temperature of 0 to 70° C. and pH 2–9, and the third condensation is preferably carried out the temperature of 10 to 100° C. and pH 2–7.

When $B^1$ represents a group of formula (1) in which $R^2$ represents halogen, the compound represented by the general formula (V) can be obtained by omitting the third condensation according to the above synthesis method.

In the naphthol compound (V), when $B^1$ is a group represented by the formula (2), a naphthol compound (V) can be obtained by condensing a compound represented by the general formula (XVI) with a compound represented by the general formula (IX).

In the naphthol compound (V), when $B^1$ is represented by the general formula (3), the naphthol compound (V) can be obtained by condensing a compound represented by the general formula (XVI) with a compound represented by the formula (X).

Other intermediates and starting materials for the preparation of the polyazo compounds of formula (I) may be obtained by the application or adaptation of known method.

As the 2,4,6-trihalogeno-s-triazine used for producing the polyazo compound of the formula (I) wherein B or $B^1$ is a group represented by the general formula (1), 2,4,6-trifluoro-s-triazine and 2,4,6-trichloro-s-triazine are preferred.

Specific examples of the compounds represented by the formulas (III) and (III-2) include 7-amino-4-hydroxynaphthalene-2-sulfonic acid, 7-amino-4-hydroxynaphthalene-2,8-disulfonic acid, 6-amino-4-hydroxynaphthalene-2-sulfonic acid, and 6-amino-4-hydroxynaphthalene-2,7-disulfonic acid.

Among them, 7-amino-4-hydroxynaphthalene-2,8-disulfonic acid is preferred.

Specific examples of the compounds represented by the general formulas (VI) and (VII) include 3-(2-sulfate ethylsulfonyl)aniline, 3-vinylsulfonylaniline, 3-(2-chloroethylsulfonyl)aniline, 3-(2-acetoxyethylsulfonyl)aniline, 4-(2-sulfate ethylsulfonyl)aniline, 4-vinylsulfonylaniline, 3-(2-sulfate ethylsulfonyl)-4-methoxyaniline, 3-vinylsulfonyl-4-methoxyaniline, 5-(2-sulfate ethylsulfonyl)-2-methoxyaniline, 5-vinylsulfonyl-2-methoxyaniline, 4-(2-sulfate ethylsulfonyl)-5-methyl-2-methoxyaniline, 4-vinylsulfonyl-5-methyl-2-methoxyaniline, 4-(2-sulfate ethylsulfonyl)-2-sulfoaniline, 4-vinylsulfonyl-2-sulfoaniline, 6-(2-sulfate ethylsulfonyl)-1-sulfo-2-aminonaphthalene, 5-(2-sulfate ethylsulfonyl)-1-sulfo-2-aminonaphthalene, 4-(2-sulfate ethylsulfonyl)-1-aminonaphthalene, 5-(2-sulfate ethylsulfonyl)-1,7-disulfo-2-aminonaphthalene, N-ethyl-3-(2-sulfate ethylsulfonyl)aniline, N-ethyl-4-(2-sulfate ethylsulfonyl)aniline

H₂ NCH₂ CH₂ SO₂ CH═CH₂,

H₂ NCH₂ CH₂ SO₂ CH₂ CH₂ Cl,

H₂ NCH₂ CH₂ SO₂ CH₂ CH₂ OSO₃ H,

H₂ N(CH₂)₃ SO₂ CH═CH₂,

H₂ N(CH₂)₃ SO₂ CH₂ CH₂ Cl,

H₂ N(CH₂)₃ SO₂ CH₂ CH₂ OSO₃ H,

H₂ N(CH₂)₄ SO₂ CH═CH₂,

H₂ N(CH₂)₄ SO₂ CH₂ CH₂ Cl,

H₂ N(CH₂ )₄ SO₂ CH₂ CH₂ OSO₃ H,

HN (CH₂ CH₂ SO₂ CH═CH₂)₂,

HN (CH₂ CH₂ SO₂ CH₂ CH₂ Cl)₂,

HN (CH₂ CH₂ SO₂ CH₂ CH₂ OSO₃ H)₂,

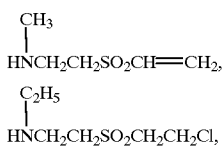

H₂ NCH₂ CH₂ NHCH₂ CH₂ SO₂ CH═CH₂,

H₂ NCH₂ CH₂ NHCH₂ CH₂ SO₂ CH₂ CH₂ Cl,

H₂ NCH₂ CH₂ NHCH₂ CH₂ SO₂ CH₂ CH₂ OSO₃ H,

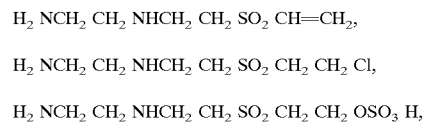

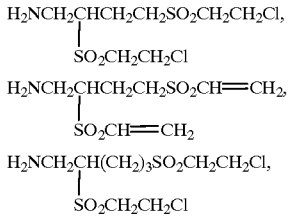

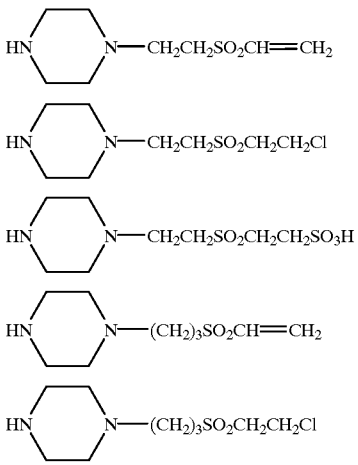

-continued

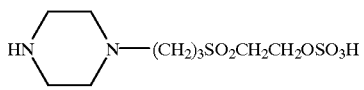

H₂NCH₂CH₂OCH₂CH₂SO₂CH₂CH₂OSO₃H,

H₂NCH₂CH₂OCH₂CH₂SO₂CH=CH₂,

H₂NCH₂CH₂OCH₂CH₂SO₂CH₂CH₂Cl,

H₂N(CH₂)₃O(CH₂)₃SO₂CH=CH₂,

H₂N(CH₂)₃OCH₂CH₂SO₂CH₂CH₂Cl, and

H₂NCH₂CH₂O(CH₂)₃SO₂CH₂CH₂OSO₃H.

Among them, 3-(2-sulfate ethylsulfonyl)aniline, 3-vinylsulfonylaniline, 3-(2-chloroethylsulfonyl)aniline, 4-(2-sulfate ethylsulfonyl)aniline, 4-vinylsulfonylaniline, N-ethyl-3-(2-sulfate ethylsulfonyl)aniline, N-ethyl-4-(2-sulfate ethylsulfonyl)aniline,

H₂NCH₂CH₂SO₂CH=CH₂,

H₂NCH₂CH₂SO₂CH₂CH₂Cl,

H₂NCH₂CH₂SO₂CH₂CH₂OSO₃H,

H₂N(CH₂)₃SO₂CH=CH₂,

H₂N(CH₂)₃SO₂CH₂CH₂Cl, and

H₂N(CH₂)₃SO₂CH₂CH₂OSO₃H are preferred.

Specific examples of the compound represented by the formula (VII) include nicotinic acid; nicotinic acid amide; pyridine; amine such as ammonia, 1-aminobenzene, 1-amino-2-, -3- or -4-methylbenzene, 1-amino-3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-amino-phenymelthanesulfonic acid, 2-, 3- or 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 2-, 3-or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid; N-methylaminobenzene, N-ethylaminobenzene, 1-methylamino-3- or -4-methylbenzene, 1-ethylamino-4-chlorobenzene, 1-ethylamino-3- or -4 -methylbenzene, 1-(2-hydroxyethyl)-amino-3-methylbenzene, 3- or -4-methylaminobenzoic acid, 3- or 4-methylaminobenzenesulfonic acid, 4-amino-3-carboxybenzenesulfonic acid, 3-amino-4-carboxybenzenesulfonic acid, 2-amino-4-methylbenzenesulfonic acid, 2-amino-5-methylbenzenesulfonic acid, 2-amino-4-methoxybenzenesulfonic acid, 2-amino-5-methoxybenzenesulfonic acid, 3-amino-4-methoxybenzenesulfonic acid, 4-amino-3-methoxybenzenesulfonic acid, 3-amino-4-methylbenzenesulfonic acid, 4-amino-3-methylbenzenesulfonic acid, morpholine, piperidine, pyrrolidine, cyclohexylamine, cyclopentylamine, methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, ε-aminocaproic acid, benzylamine, 2-, 3- or 4-chlorobenzylamine, bis-(2-sulfatoethyl)amine, 4-methylbenzylamine, N-methylbenzylamine, 2-, 3- or 4-sulfobenzylamine, 2-phenylethylamine, 1-phenylethylamine and 1-phenyl-2-propylamine;

aromatic compound such as phenol, 1-hydroxy-2-, -3- or -4-methylbenzene, 1-hydroxy-3,4- or -3,5-dimethylbenzene, 1-hydroxy-2-, -3-or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or -4-hydroxy-phenylmethanesulfonic acid, 3-hydroxybenzenesulfonic acid, 4-hydroxybenzenesulfonic acid, 5-hydroxybenzene-1,3-disulfonic acid, 6-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid, 2-hydroxynaphthalene-1-sulfonic acid, 4-hydroxynaphthalene-1-sulfonic acid, 5-hydroxynaphthalene-1-sulfonic acid, 6-hydroxynaphthalene-1-sulfonic acid, 7-hydroxynaphthalene-1-sulfonic acid, 6-hydroxynaphthalene-1-sulfonic acid, 1-hydroxynaphthalene-2-sulfonic acid, 4-hydroxynaphthalene-2-sulfonic acid, 5-hydroxynaphthalene-2-sulfonic acid, 6-hydroxynaphthalene-2-sulfonic acid, 7-hydroxynaphthalene-2-sulfonic acid, 8-hydroxynaphthalene-2-sulfonic acid, 4-hydroxynaphthalene-1,3-disulfonic acid, 5-hydroxynaphthalene-1,3-disulfonic acid, 6-hydroxynaphthalene-1,3-disulfonic acid, 7-hydroxynaphthalene-1,3-disulfonic acid, 8-hydroxynaphthalene-1,3-disulfonic acid, 2-hydroxynaphthalene-1,5-disulfonic acid, 3-hydroxynaphthalene-1,5-disulfonic acid, 4-hydroxynaphthalene-1,5-disulfonic acid, 4-hydroxynaphthalene-1,6-disulfonic acid, 8-hydroxynaphthalene-1,6-disulfonic acid,
4-hydroxynaphthalene-1,7-disulfonic acid,
3-hydroxynaphthalene-2,6-disulfonic acid,
4-hydroxynaphthalene-2,6-disulfonic acid,
3-hydroxynaphthalene-2,7-disulfonic acid,
4-hydroxynaphthalene-2,7-disulfonic acid,
6-hydroxynaphthalene-1,3,5-trisulfonic acid,
7-hydroxynaphthalene-1,3,5-trisulfonic acid and
4-hydroxynaphthalene-1,3,6-trisulfonic acid;

aliphatic compound such as methanol, ethanol, n-propanol, isopropanol, n-butanol, isobutanol, sec-butanol, 2-chloroethanol, 2-methoxyethanol, 3-methoxypropanol, 3-ethoxypropanol, 2-hydroxyethanesulfonic acid, 3-hydroxy-1-propanesulfonic acid, 2-cyanoethanol, 2-sulfate ethanol, glycolic acid, 3-hydroxypropionic acid, benzyl alcohol, 2- or 3-or 4-chlorobenzyl alcohol, 4-methylbenzyl alcohol, 2-, 3- or 4-sulfobenzyl alcohol, 2-phenyl ethanol and 1-phenyl-2-propanol;

$H_2O$;

and compounds wherein hydroxy of the above compounds is substituted with mercapto.

Among them, ammonia, 1-aminobenzene, 1-amino-2-, 3- or -4-methylbenzene, 1-amino-3,4- or -3,5-dimethylbenzene, 1-amino-2-, -3- or -4-ethylbenzene, 1-amino-2-, -3- or -4-methoxybenzene, 2-, 3- or 4-aminobenzenesulfonic acid, 6-aminobenzene-1,3-disulfonic acid, 6-aminobenzene-1,4-disulfonic acid, 2-, 3- or 4-aminobenzoic acid, N-methylaminobenzene, N-ethylaminobenzene, morpholine and 2-aminoethanesulfonic acid are preferred.

Specific examples of the compound represented by the formula (VIII) include 1,2-diaminobenzene, 1,3-diaminobenzene, 1,4-diaminobenzene, 2-methyl-1,4-diaminobenzene, 4-methyl-1,3-diaminobenzene, 2-ethyl-1,4-diaminobenzene, 4-ethyl-1,3-diaminobenzene, 2-methoxy-1,4-diaminobenzene, 4-methoxy-1,3-diaminobenzene, 2-ethoxy-1,4-diaminobenzene, 4-ethoxy-1,3-diaminobenzene, 2,5-di-methyl-1,4-diaminobenzene, 4,6-dimethyl-1,3-diaminobenzene, 2-methyl-5-methoxy-1,4-diaminobenzene, 2,5-dimethoxy-1,4-diaminobenzene, 2-chloro-1,4-diaminobenzene, 2-bromo-1,4-diaminobenzene, 2-sulfo-1,4-diaminobenzene, 4-sulfo-1,3-diaminobenzene, 2-sulfo-5-methyl-1,4-diaminobenzene, 2-sulfo-5-methoxy-1,4-diaminobenzene, 2-sulfo-5-chloro-1,4-diaminobenzene, 2-sulfo-5-bromo-1,4-diaminobenzene, 4-sulfo-6-methyl-1,3-diaminobenzene, 4-sulfo-6-methoxy-1,3-diaminobenzene, 4-sulfo-6-ethoxy-1,3-diaminobenzene, 4-sulfo-6-chloro-1,3-diaminobenzene, 4-sulfo-6-bromo-1,3 -diaminobenzene, 2,5-disulfo-1,4-diaminobenzene, 4,6-disulfo-1,3-diaminobenzene, 3-methylamino-6-sulfoaniline, 3-ethylamino-6-sulfoaniline, 3-aminomethyl-6-sulfoaniline, 4-aminomethyl-2-sulfoaniline, and 5-aminomethyl-2-aminonaphthalene-1-sulfonic acid.

Among them, 4-sulfo-1,3-diaminobenzene is preferred.

Specific examples of the compound represented by the formula (XVI) include 7-amino-4-hydroxynaphthalene-2-sulfonic acid, 7-amino-4-hydroxynaphthalene-2,8-disulfonic acid, 7-methylamino-4-hydroxynaphthalene-2-sulfonic acid, 6-amino-4-hydroxynaphthalene-2-sulfonic acid, 6-amino-4-hydroxynaphthalene-2,7-disulfonic acid, 8-amino-4-hydroxynaphthalene-2-sulfonic acid, 5-amino-4-hydroxynaphthalene-2,7-disulfonic acid and 5-amino-4-hydroxynaphthalene-2,8-disulfonic acid.

Among them, 7-amino-4-hydroxynaphthalene-2-sulfonic acid and 7-amino-4-hydroxynaphthalene-2,8-disulfonic acid are preferred.

Specific examples of the compound represented by the formula (IX) include 2,4,6-trifluoro-5-chloropyrimidine, 4,6-difluoro-5-chloropyrimidine, 2,4,6-trifluoropyrimidine, 2,4,5,6-tetrachloropyrimidine and 2,4,6-trifluoro-5-cyanopyrimidine.

Specific examples of the compound represented by the formula (XI) include acetyl-chloride, propionyl chloride, butyryl chloride, benzoyl chloride, p-nitrobenzoyl chloride and p-methoxybenzoyl chloride.

Specific examples of the compound represented by the formula (XVIII) include acetic anhydride, propionic anhydride and butanoic anhydride.

Specific examples of the compound represented by the formula (XIX) include succinic anhydride, glutaric anhydride and phthalic anhydride.

Specific examples of the compound represented by the formula (XII) include 7-amino-4-hydroxynaphthalene-2-sulfonic acid, 7-amino-4-hydroxynaphthalene-2,8-disulfonic acid, 6-amino-4-hydroxynaphthalene-2-sulfonic acid, 6-amino-4-hydroxynaphthalene-2,7-disulfonic acid, 8-amino-4-hydroxynaphthalene-2-sulfonic acid, 5-amino-4-hydroxynaphthalene-2,7-disulfonic acid and 5-amino-4-hydroxynaphthalene-2,8-disulfonic acid.

Among them, 7-amino-4-hydroxynaphthalene-2-sulfonic acid and 7-amino-4-hydroxynaphthalene-2,8-disulfonic acid are preferred.

Specific examples of the compound represented by the formula (XIII) include methanesulfonyl chloride, phenylsulfonyl chloride and p-toluenesulfonyl chloride.

Specific examples of the compound represented by the formula (II) include compound having a reactive substituent, such as 3-(2-sulfate ethylsulfonyl)aniline, 3-vinylsulfonylaniline, 3-(2-chloroethylsulfonyl)aniline, 3-(2-acetoxyethylsulfonyl) aniline, 4-(2-sulfate ethylsulfonyl)aniline, 4-vinylsulfonylaniline, 3-(2-sulfate ethylsulfonyl)-4-methoxyaniline, 3 -vinylsulfonyl-4-methoxyaniline, 5-(2-sulfate ethylsulfonyl)-2-methoxyaniline, 5-vinylsulfonyl-2-methoxyaniline, 4-(2-sulfate ethylsulfonyl)-5-methyl-2-methoxyaniline, 4-vinylsulfonyl-5-methyl-2-methoxyaniline, 4-(2-sulfate ethylsulfonyl)-2-sulfoaniline, 4-vinylsulfonyl-2-sulfoaniline, 6-(2-sulfate ethylsulfonyl)-1-sulfo-2-aminonaphthalene, 5-(2-sulfate ethylsulfonyl)-1-sulfo-2-aminonaphthalene, 4-(2-sulfate ethylsulfonyl)-1-aminonaphthalene and 5-(2-sulfate ethylsulfonyl)-1,7-disulfo-2-aminonaphthalene; and compound having no reactive substituent, such as 2-, 3- or 4-sulfoaniline, 2,4- or 2,5-disulfoaniline, 2-carboxy-4- or 5-sulfoaniline, 2-sulfo-4-methoxyaniline, 2-sulfo-4-methylaniline, 2-aminonaphthalene-1-sulfonic acid, 2-aminonaphthalene-1,5-disulfonic acid, 2-aminonaphthalene-4,8-disulfonic acid, 2-aminonaphthalene-3,6-disulfonic acid, 2-aminonaphthalene-6,8-disulfonic acid, 2-aminonaphthalene-3,7-disulfonic acid, 2-aminonaphthalene-4,7-disulfonic acid, 2-aminonaphthalene-5,7-disulfonic acid, 2-aminonaphthalene-1,5,7-trisulfonic acid, 2-aminonaphthalene-4,6,8-trisulfonic acid, 2-aminonaphthalene-3,6,8-trisulfonic acid and 1-aminonaphthalene-3,6,8-trisulfonic acid, in addition to compound which can be obtained from the compounds represented by the general formulas (VI), (VII) and (VIII) and 2,4,6-trihalogeno-s-triazine.

Among them, 5-(2-sulfate ethylsulfonyl)-2-methoxyaniline, 5-vinylsulfonyl-2-methoxyaniline, 4-(2- sulfate ethylsulfonyl)-5-methyl-2-methoxyaniline, 4-vinylsulfonyl-5-methyl-2-methoxyaniline, 4-(2-sulfate ethylsulfonyl)-2-sulfoaniline, 4-vinylsulfonyl-2-sulfoaniline, 6-(2-sulfate ethylsulfonyl)-1-sulfo-2-aminonaphthalene, 5-(2-sulfate ethylsulfonyl)-1-sulfo-2-aminonaphthalene, S-(2-sulfate ethylsulfonyl)-1,7-disulfo-2-aminonaphthalene, 2-, 3-or 4-sulfoaniline, 2,4-or 2,5-disulfoaniline, 2-sulfo-4-methoxyaniline, 2-sulfo-4-methylaniline, 2-aminonaphthalene-1-sulfonic acid, 2-aminonaphthalene-1,5-disulfonic acid, 2-aminonaphthalene-1,5,7-trisulfonic acid and 2-aminonaphthalene-3,6,8-trisulfonic acid are preferred.

Examples of the compound represented by the general formula (V) include 3-, 4- or 5-sulfo-1-naphthol, 3,6-disulfo-1-naphthol, 3,8-disulfo-1-naphthol, ,6,8-trisulfo-1-naphthol, 6-, 7- or 8-sulfo-2-naphthol, 3,6-disulfo-2-naphthol and 6,8-disulfo-2-naphthol, in addition to compound which can be obtained from the compound represented by the formulas (XI), (XVIII) or (XIX) and the compound represented by the formula (XII);

compound which can be obtained from the compounds represented by the general formulas (XIII) and (XII); compound which can be obtained by the compounds represented by the general formulas (VI), (VII) and (XVI) and 2,4,6-trihalogeno-s-triazine;

compound which can be obtained from the above compounds represented by the general formulas (XVI) and (IX); and compound which can be obtained from the above compound represented by the general formula (XVI) And the above compound represented by the general formula (X).

Specific examples of the compound which can be obtained from the compound represented by the general formula (XI), (XVIII) or (XIX) and the compound represented by the general formula (XII) include:

6- or 7-acetylamino-3-sulfo-1-naphthol,
6- or 7-propionylamino-3-sulfo-1-naphthol,
6- or 7-(2-carboxyethylcarbonylamino)-3-sulfo-1-naphthol,
6- or 7-benzoylamino-3-sulfo-1-naphthol,
6- or 7-methanesulfonylamino-3-sulfo-1-naphthol,
6- or 7-phenylsulfonylamino-3-sulfo-1-naphthol,
6- or 7-(p-toluenesulfonylamino)-3-sulfo-1-naphthol,
8-acetylamino-3, 5-disulfo-1-naphthol,
8-propionylamino-3,5-disulfo-1-naphthol,
8-(2-carboxyethylcarbonylamino)-3,5-disulfo-1-naphthol,
8-benzoylamino-3,5-disulfo-1-naphthol,
8-methanesulfonylamino-3,5-disulfo-1-naphthol,
8-phenylsulfonylamino-3,5-disulfo-1-naphthol,
8-(p-toluenesulfonylamino)-3,5-disulfo-1-naphthol,
8-acetylamino-3, 6-disulfo-1-naphthol,
8-propionylamino-3,6-disulfo-1-naphthol,
8-(2-carboxyethylcarbonylamino)-3,6-disulfo-1-naphthol,
8-benzoylamino-3,6-disulfo-1-naphthol,
8-methanesulfonylamino-3,6-disulfo-1-naphthol,
8-phenylsulfonylamino-3, 6-disulfo-1-naphthol, and 8-(p-toluenesulfonylamino)-3,6-disulfo-1-naphthol.

The polyazo compound (I) of the present invention and a raw material thereof may take the form of a free acid, a salt thereof or a mixture thereof. An alkali metal salt, an alkaline earth metal salt and a mixture containing them are preferred. Among them, a sodium salt, a potassium salt, a lithium salt and a mixture containing them are particularly preferred.

The polyazo compound (I) of the present invention can be used as a dye for dyeing and textile-printing a fiber material. The fiber material dyed or textile-printed by the polyazo compound (I) may be any one which has a hydroxy group and/or an amide group, and is not specifically limited. Examples thereof include natural or regenerated cellulose fiber, natural or synthetic polyamide fiber, polyurethane fiber, hide and a mixed fabric material containing them.

Examples of the natural cellulose fiber include cotton, linen, hemp, jute and ramie fiber. Preferred is cotton.

Specific examples of the regenerated cellulose include rayon, polynosic, cupra fiber and those having trade names such as "Tencel", "Tafcel". "Modal" and "Celtima".

Specific examples of the natural or synthetic polyamide fiber include wool, silk, polyamide-6,6, polyamide-6, polyamide-11 and polyamide-4.

Examples of the mixed fabric material include mixed fabric material of the above fiber materials and synthetic fibers such as polyester, nylon, acrylic, etc., in addition to mixed fabric material of the above fiber materials.

Using the compound of the present invention, the above fiber materials can be dyed or textile-printed by a method according to physical/chemical properties.

Specific examples of the method include exhaustion dyeing method, cold batch-up method, continuous dyeing method, textile-printing method.

Examples of the exhaustion dyeing method include a method of carrying out the dyeing at the temperature of about 30 to 100° C. in the presence of an acid binder such as sodium carbonate, sodium hydrogencarbonate, sodium tertiary phosphate and sodium hydroxide by optionally adding a neutral salt such as sodium sulfate and sodium chloride, and optionally using in combination with a solubilizing agent, an osmotic agent, leveling agent or the like. The acid binder and neutral salt may be added in one portion or in several portion according to a normal method.

When the cellulose fiber is dyed by the cold batch-up method, the method may be carried out by padding with a neutral salt such as sodium sulfate and sodium chloride, and an acid binder such as sodium hydroxide and sodium silicate, followed by standing the resultant dyed product in a seal-packing material at a constant temperature.

When the cellulose fiber is dyed by the continuous dyeing method, there may be used a one-phase padding method or a two-phase padding method. The one-phase padding method may be carried out by padding at room temperature or elevated temperature in the presence of an acid binder such as sodium carbonate and sodium hydrogencarbonate according to a known method, followed by steaming or dry heating. The two-phase padding method may be carried out by dipping a fiber in a padding solution wherein the compound of the present invention is dissolved, padding a neutral salt such as sodium sulfate and sodium chloride and an acid binder such as sodium hydroxide and sodium silicate, followed by steaming or dry heating.

Examples of the textile-printing method include a method of textile-printing a cellulose fiber with a textile-printing paste containing an acid binder such as sodium hydrogencarbonate in one phase, followed by steaming at high temperature of not less than 80° C.; and a method of textile-printing a cellulose fiber with a neutral or weak-acid textile-printing paste, passing it through an alkaline bath containing an electrolyte or overpadding with an alkaline padding solution containing an electrolyte, followed by steaming or dry heating. The textile-printing paste may contains a sizing agent such as sodium alginate and starch ether and/or an emulsifier and may optionally contains a textile-printing aid such as urea and/or a dispersant.

When the cellulose fiber is dyed or textile-printed using the compound of the present invention, the acid binder is not specifically limited and there can be used, for example, sodium carbonate, sodium hydrogencarbonate, sodium tertiary phosphate, sodium hydroxide, sodium silicate, potassium hydroxide, sodium formate, potassium carbonate, sodium primary or secondary phosphate and sodium trichloroacetate.

When the synthetic or natural polyamide fiber or polyurethane fiber is exhaustion-dyed, there may be adopted a method in which the compound of the present invention is exhausted in an acid or weak-acid dye bath under the control of pH and, then, the pH is changed into neutral or alkali at the temperature of about 60 to 120° C. There may be optionally used a leveling agent such as condensate of cyanuric chloride and aminobenzenesulfonic acid, condensate of cyanuric chloride and aminonaphthalenesulfonic acid and adduct of stearylamine and ethylene oxide.

The polyazo compound of the present invention can be optionally used in combination with other dyes as far as the feature of the present invention is not adversely affected in order to obtain a desired hue. The dye used in combination with the polyazo compound of the present invention may be any reactive dye other than the polyazo compound of the present invention, and is not specifically limited. Examples thereof include dyes having at least one group selected from the group consisting of sulfatoethyl sulfone group, vinyl sulfone group, monochlorotriazine group, monofluorotriazine group, mononicotinic acid triazine group, dichlorotriazine group, difluoromonochloropyrimidine group and trichloropyrimidine group;

dyes which are commercially available under the trade name of Sumifix, Sumifix Supra, Remazol, Levafix, Procion, Cibacron, Basilen, Drimarene, Kayacion, Kayacelon React, etc.;

dyes described in respective gazettes such as JP-A-50-178, JP-A-56-9483, JP-A-56-15481, JP-A-56-118976, JP-A-56-128380, JP-A-57-2365, JP-A-57-89679, JP-A-57-143360, JP-A-58-191755, JP-A-59-15451, JP-A-59-96174, JP-A-59-161463, JP-A-60-6754, JP-A-60-123559, JP-A-60-229957, JP-A-60-26054, JP-A-61-126175, JP-A-61-155469, JP-A-61-225256, JP-A-63-77974, JP-A-63-225664, JP-A-1-185370, JP-A-3-770, JP-A-5-117538, JP-A-5-247366 and JP-A-6-287463; and dyes represented by C.I. Reactive Blue 19 and C.I. Reactive Black 5.

According to the present invention, there can be obtained a dye exhibiting excellent reproducibility, that is, affording dyed or textile-printed product having good quality regardless of changes of dyeing temperature, amount of neutral salt and acid binder and dye bath ratio, excellent levelness, high build-up properties, high color value and high effective dyeing ratio in a dyeing and textile-printing treatment of fiber materials; and capable of affording a dyed or textile-printed product having various excellent fastnesses, particularly chlorine atom treated water fastness, tap water chlorine atom fastness, light fastness and perspiration light fastness. The resultant dyed product or textile-printed product causes little discoloration at the time of various processing treatments such as fixing treatment and resin treatment and is also superior in storage stability. Therefore, there is little influence due to contact with a basic substance derived from a plastic bag, which is considered to be caused during storage in the plastic bag.

The following Examples further illustrate the present invention in detail but are not to be construed to limit the scope thereof. In the Examples, "parts" and "%'s" are by weight unless otherwise stated.

EXAMPLE 1

In an aqueous solvent, 18.8 parts of 4-sulfo-1,3-diaminobenzene was condensed with 18.4 parts of 2,4,6-trichloro-s-triazine according to a normal method. The resultant condensate was condensed with 28.1 parts of 3-(2-sulfate ethylsulfonyl)aniline according to a normal method. The product was diazotized by using sodium nitrite, and then diazo-coupled with 31.9 parts of 7-amino-4-hydroxynaphthalene-2,8-disulfonic acid according to a normal method to obtain a monoazo compound. This monoazo compound was further diazotized by using sodium nitrite and then diazo-coupled with 30.4 parts of 3,6-disulfo-1-naphthol to obtain a compound, the form of a free acid of which is represented by the following formula:

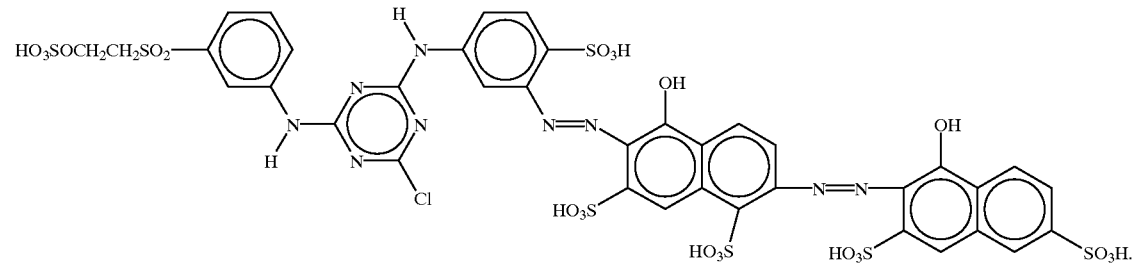

(λmax = 546 nm)

EXAMPLE 2

In an aqueous solvent, 26.8 parts of 4,6-disulfo-1,3-diaminobenzene was condensed with 18.4 parts of 2,4,6-trichloro-s-triazine according to a normal method. The resultant condensate was condensed with 28.1 parts of 3-(2-sulfate ethylsulfonyl)aniline according to a normal method. The product was diazotized by using sodium nitrite, and then diazo-coupled with 31.9 parts of 7-amino-4-hydroxynaphthalene-2,8-disulfonic acid, followed by condensing the resultant compound with 9.3 parts of aniline according to a normal method to obtain a monoazo compound. This monoazo compound was further diazotized by using sodium nitrite and then diazo-coupled with 30.4 parts of 3,6-disulfo-1-naphthol to obtain a compound, the form of a free acid of which is represented by the following formula:

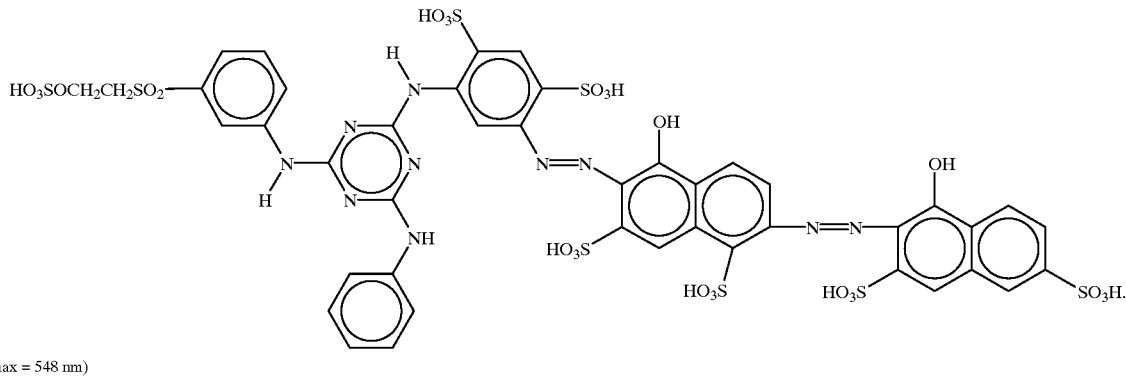

(λmax = 548 nm)

EXAMPLE 3

In an aqueous solvent, 23.9 parts of 7-amino-4-hydroxynaphthalene-2-sulfonic acid was condensed with 10.0 parts of succinic anhydride according to a normal method to obtain a naphthol derivative.

In an aqueous solvent, 18.8 parts of 4-sulfo-1,3-diaminobenzene was condensed with 18.4 parts of 2,4,6-trichloro-s-triazine according to a normal method and the resultant condensate was condensed with 28.1 parts of 4-(2-sulfate ethylsulfonyl)aniline according to a normal method. The product thus obtained was diazotized by using sodium nitrite, the diazotized product was diazo-coupled with 31.9 parts of 7-amino-4-hydroxynaphthalene-2,8-disulfonic acid to obtain a monoazo compound. This monoazo compound was further diazotized by using sodium nitrite and then diazo-coupled with the above naphthol derivative to obtain a compound, the form of a free acid of which is represented by the following formula:

compound of the column 5, a compound of the column 6 and a compound of the column 7 shown in Table 1 in place of 7-amino-4-hydroxynaphthalene-2-sulfonic acid, succinic anhydride, 4-sulfo-1,3-diaminobenzene, 2,4,6-trichloro-s-triazine, 4-(2-sulfate ethylsulfonyl)aniline and 7-amino-4-hydroxynaphthalene-2,8-disulfonic acid used in Example 3, respectively, each corresponding polyazo compound was obtained. Using the polyazo compound thus obtained, dyeing was carried out and a dyed product having a color shown in the column 8 of Table 1 was obtained The symbols used in the following tables and Example 27 represent the following compound:

1a: 7-amino-4-hydroxynaphthalene-2-sulfonic acid
1b: 7-amino-4-hydroxynaphthalene-2,8-disulfonic acid
1c: 7-methylamino-4-hydroxynaphthalene-2-sulfonic acid

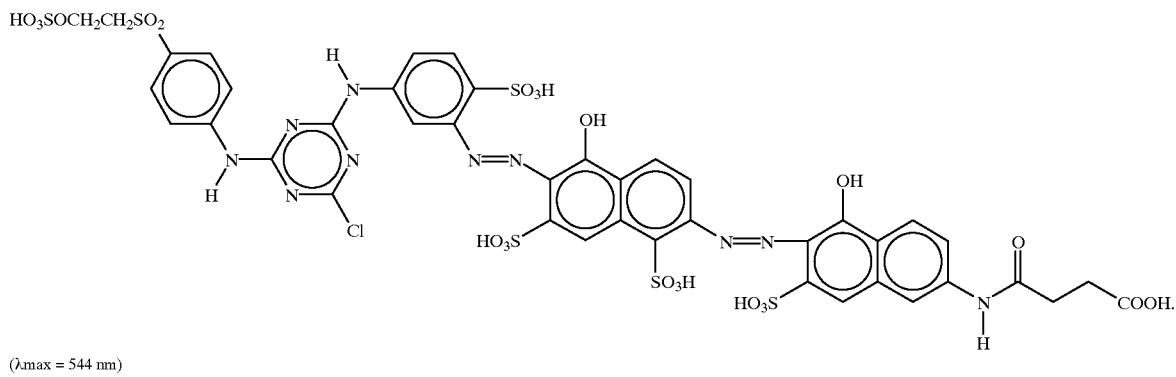

(λmax = 544 nm)

EXAMPLE 4

According to the same manner as that described in Example 3 except for using a compound of the column 2, a compound of the column 3, a compound of the column 4, a 1d: 6-amino-4-hydroxynaphthalene-2-sulfonic acid
1e: 6-amino-4-hydroxynaphthalene-2,7-disulfonic acid
1f: 8-amino-4-hydroxynaphthalene-2-sulfonic acid
1g: 5-amino-4-hydroxynaphthalene-2,7-disulfonic acid
1h: 5-amino-4-hydroxynaphthalene-2,8-disulfonic acid 2a 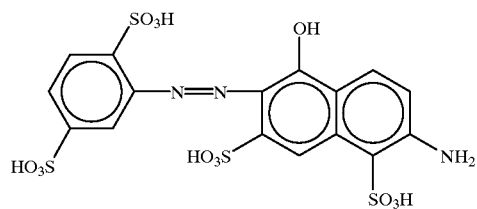
2b 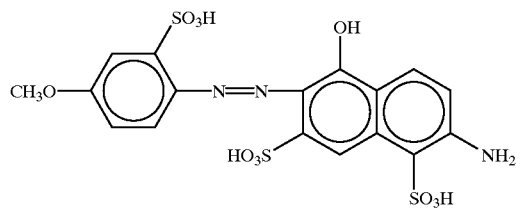
2c 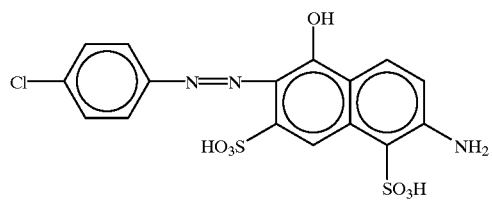
2d 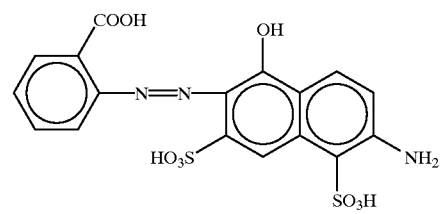
2e 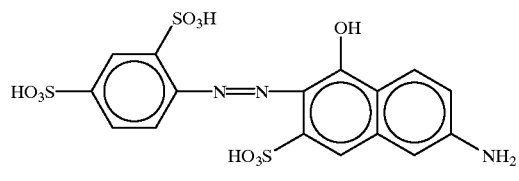
2f 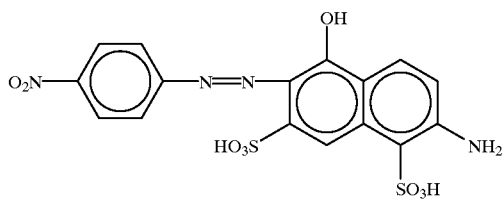
2g 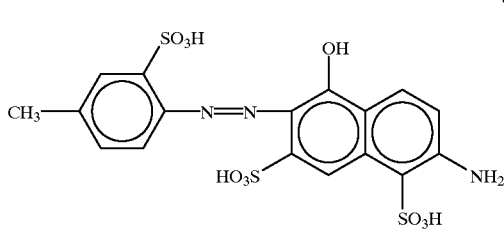
2h 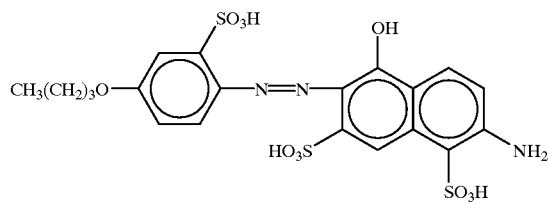
2i 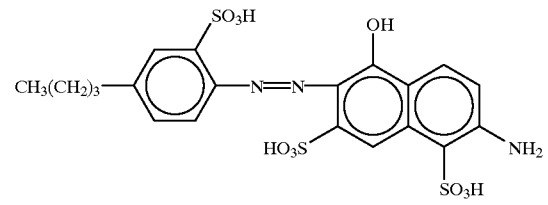
2j 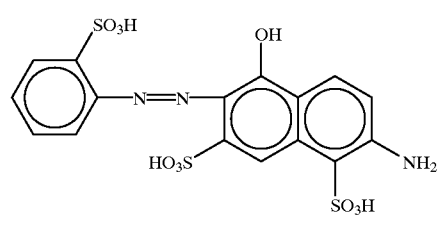

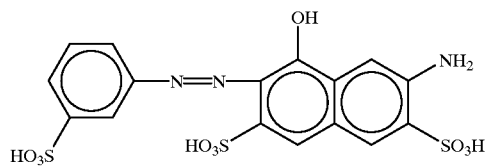
2k
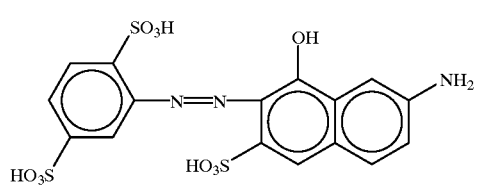
2l
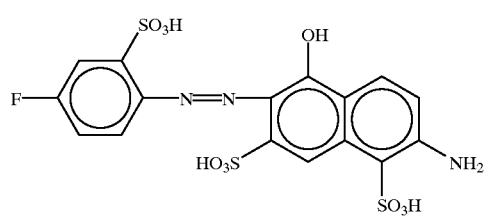
2m
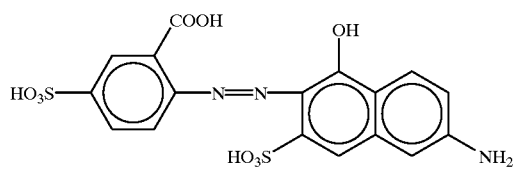
2n
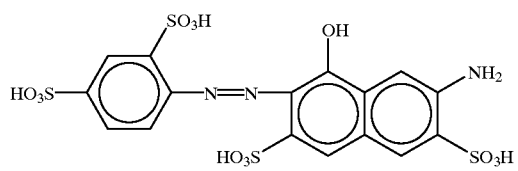
2o
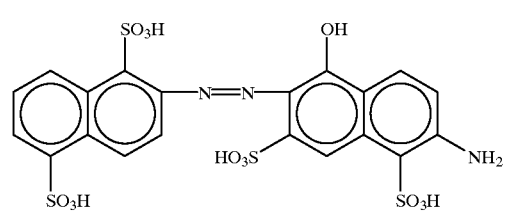
2p
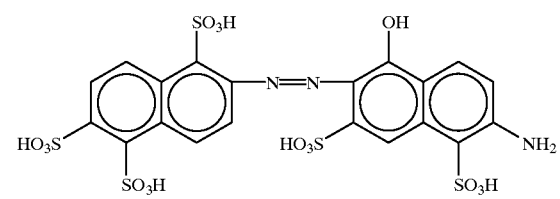
2q
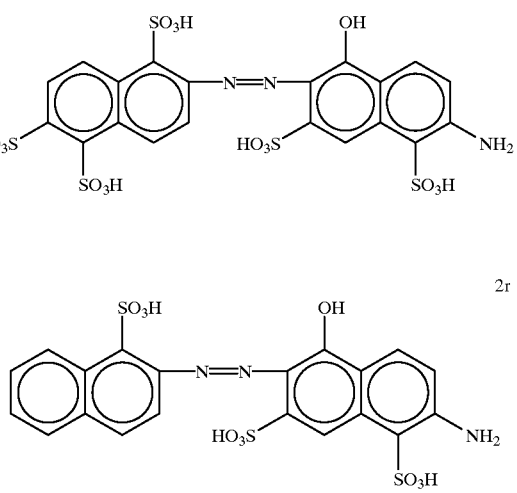
2r
2s
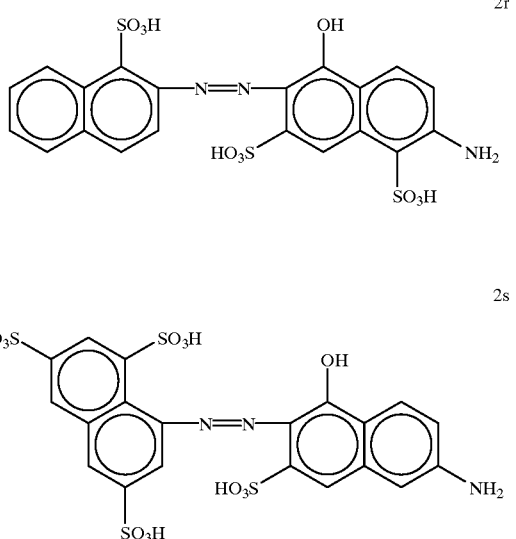
2t
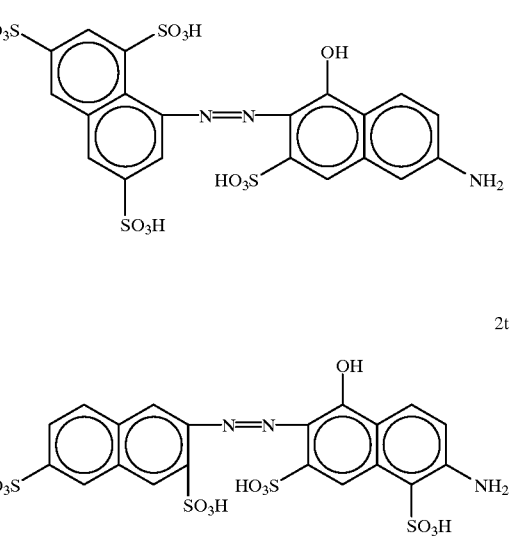
3a 2,5-disulfoaniline
3b 2,4-disulfoaniline
| | |
|---|---|
| $H_2NCH_2CH_2SO_2CH_2CH_2OSO_3H$ | 3c |
| $H_2N(CH_2)_3SO_2CH_2CH_2OSO_3H$ | 3d |
| $H_2NCH_2CH_2SO_2CH_2CH_2Cl$ | 3e |
| $H_2N(CH_2)_3SO_2CH_2CH_2Cl$ | 3f |
| $H_2NCH_2CH_2SO_2CH=CH_2$ | 3g |
| $H_2N(CH_2)_3SO_2CH=CH_2$ | 3h |
| $H_2NCH_2CH_2OCH_2CH_2SO_2CH=CH_2$ | 3i |
| $HN(CH_2CH_2SO_2CH_2CH_2OSO_3H)_2$ | 3j |
| $HO_3SOCH_2CH_2NHCH_2CH_2SO_2CH_2CH_2OSO_3H$ | 3k |

31

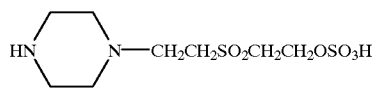

4a: 3-(2-sulfate ethylsulfonyl)aniline
4b: 3-vinylsulfonylaniline
4c: 3-(2-chloroethylsulfonyl)aniline
4d: 3-(2-acetoxyethylsulfonyl)aniline
4e: 4-(2-sulfate ethylsulfonyl)aniline
4f: 4-vinylsulfonylaniline
4g: 3-(2-sulfate ethylsulfonyl)-4-methoxyaniline
4h: 3-vinylsulfonyl-4-methoxyaniline
4i: 5-(2-sulfate ethylsulfonyl)-2-methoxyaniline
4j: 5-vinylsulfonyl-2-methoxyaniline
4k: 4-(2-sulfate ethylsulfonyl)-5-methyl-2-methoxyaniline
4l: 4-vinylsulfonyl-5-methyl-2-methoxyaniline
4m: 4-(2-sulfate ethylsulfonyl)-2-sulfoaniline
4n: 4-vinylsulfonyl-2-sulfoaniline
4o: 6-(2-sulfate ethylsulfonyl)-1-sulfo-2-aminonaphthalene
4p: 5-(2-sulfate ethylsulfonyl)-1-sulfo-2-aminonaphthalene
4q: 4-(2-sulfate ethylsulfonyl)-1-aminonaphthalene
4r: 5-(2-sulfate ethylsulfonyl)-1,7-disulfo-2-aminonaphthalene
4s: nicotinic acid
4t: nicotinic acid amide
4u: pyridine
4v: N-ethyl-3-(2-sulfate ethylsulfonyl1)aniline
4w: N-(2-cyanoethyl)-3-(2-sulfate ethylsulfonyl)aniline
4x: 2,4,6-trichloro-s-triazine
4y: 2,4,6-trifluoro-s-triazine
5a: 2-sulfoaniline
5b: 3-sulfoaniline
5c: 4-sulfoaniline
5d: 2-ethylaniline
5e: N-ethylaniline
5f: 4-chloro-N-ethylaniline
5g: N-(2-cyanoethyl)aniline
5h: N-phenyl-β-alanine
5i: N-phenyltaurine
5j: 2-sulfo-4-methoxyaniline
5k: 4-methoxyaniline
5l: anthranilic acid
5m: 4-(n-butyl)aniline
5o: 4-(n-butoxy)aniline
5p: 3,6,8-trisulfo-2-aminonaphthalene
5q: β-alanine
5r: taurine
5s: 7-aminobutyric acid
5t: H$_2$NCN
5u: aniline
5v: morpholine
5w: methanol
5x: phenol
5y: 1,5-disulfo-2-aminonaphthalene
5z: 1-sulfo-2-aminonaphthalene
6a: 2,4,6-trichloro-5-chloropyrimidine
6b: 2,4,6-trifluoro-5-chloropyrimidine
6c: 4,6-difluoro-5-chloropyrimidine
6d: 2,4,6-trifluoropyrimidine
6e: 2,4,5,6-tetrachloropyrimidine
6f: 2,4,6-trifluoro-5-cyanopyrimidine

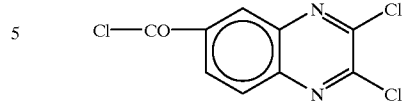

6h: acetic anhydride
6i: propionic anhydride
6j: succinic anhydride
6k: benzoyl chloride
6l: methanesulfonyl chloride
6m: phenylsulfonyl chloride
6n: p-toluenesulfonyl chloride
7a: 3-sulfo-1-naphthol
7b: 4-sulfo-1-naphthol
7c: 5-sulfo-1-naphthol
7d: 3,6-disulfo-1-naphthol
7e: 3,8-disulfo-1-naphthol
7f: 3,6,8-trisulfo-1-naphthol
7g: 6-sulfo-2-naphthol
7h: 7-sulfo-2-naphthol
7i: 8-sulfo-2-naphthol
7j: 3,6-disulfo-2-naphthol
7k: 6,8-disulfo-2-naphthol
8a: 4-ethyl-1,3-diaminobenzene
8b: 4-methoxy-1,3-diaminobenzene
8c: 2-sulfo-1,4-diaminobenzene
8d: 4-sulfo-1,3-diaminobenzene
8e: 2-sulfo-5-methyl-1,4-diaminobenzene
8f: 2-sulfo-5-chloro-1,4-diaminobenzene
8g: 2,5-disulfo-1,4-diaminobenzene
8h: 4,6-disulfo-1,3-diaminobenzene
8i: 3-methylamino-6-sulfoaniline
8j: 3-ethylamino-6-sulfoaniline
8k: 3-aminomethyl-6-sulfoaniline
8l: 4-aminomethyl-2-sulfoaniline
8m: 5-aminomethyl-2-aminonaphthalene-1-sulfonic acid

TABLE 1

| Column 1 | Column 2 | Column 3 | Column 4 | Column 5 | Column 6 | Column 7 | Column 8 |
|---|---|---|---|---|---|---|---|
| 19 | 1a | 6k | 3d | 4x | 8d | 1b | red |
| 20 | 1a | 6k | 8d | 4x | 4c | 1b | red |

EXAMPLE 5

According to the same manner as that described in Example 3 except for using a compound of the column 2, a compound of the column 3, a compound of the column 4, a compound of the column 5, a compound of the column 6 and a compound of the column 7 shown in Table 2 in pace of 7-amino-4-hydroxynaphthalene-2-sulfonic acid, succinic anhydride, 4-sulfo-1,3-diaminobenzene, 2,4,6-trichloro-s-triazine, 4-(2-sulfate ethylsulfonyl) aniline and 7-amino-4-hydroxynaphthalene-2,8-disulfonic acid used in Example 3, respectively, each corresponding polyazo compound is obtained.

TABLE 2

| Column 1 | Column 2 | Column 3 | Column 4 | Column 5 | Column 6 | Column 7 |
|---|---|---|---|---|---|---|
| 5 | 1a | 6b | 8d | 4x | 4a | 1b |
| 6 | 1a | 6c | 8d | 4x | 4a | 1b |
| 7 | 1a | 6d | 8d | 4x | 4a | 1b |
| 8 | 1a | 6e | 8d | 4x | 4a | 1b |
| 9 | 1a | 6f | 8d | 4x | 4a | 1b |
| 10 | 1a | 6g | 8d | 4x | 4a | 1b |
| 11 | 1a | 6i | 8d | 4x | 4a | 1b |
| 12 | 1a | 6i | 3c | 4x | 8d | 1b |
| 13 | 1g | 6i | 8d | 4x | 4a | 1b |
| 14 | 1a | 6j | 8d | 4x | 4a | 1b |
| 15 | 1a | 6j | 3c | 4x | 8d | 1b |
| 16 | 1a | 6j | 3a | 4y | 8d | 1b |
| 17 | 1a | 6j | 3a | 4y | 8d | 1e |
| 18 | 1a | 6k | 3a | 4y | 8d | 1b |
| 21 | 1g | 6k | 8d | 4x | 4a | 1b |
| 22 | 1a | 6l | 8d | 4x | 4a | 1b |
| 23 | 1b | 6l | 8d | 4x | 4a | 1b |
| 24 | 1a | 6m | 3c | 4x | 8h | 1b |
| 25 | 1d | 6m | 4m | 4x | 8d | 1b |
| 26 | 1a | 6n | 8d | 4x | 4a | 1b |

EXAMPLE 6

In an aqueous solvent, 23.9 parts of 7-amino-4-hydroxynaphthalene-2-sulfonic acid was condensed with 14.1 parts of benzoyl chloride according to a normal method to obtain a naphthol derivative.

In an aqueous solvent, 25.3 parts of 2,5-disulfoaniline was condensed with 18.4 parts of 2,4,6-trichloro-s-triazine according to a normal method and the resultant condensate was condensed with 18.8 parts of 4-sulfo-1,3-diaminobenzene according to a normal method. The product was diazotized by using sodium nitrite, the diazotized product was diazo-coupled with 31.9 parts of 7-amino-4-hydroxynaphthalene-2,8-disulfonic acid, and then condensed with 28.1 parts of 3-(2-sulfate ethylsulfonyl)aniline according to a normal method to obtain a monoazo compound. This monoazo compound was further diazotized by using sodium nitrite and then diazo-coupled with the above naphthol derivative to obtain a compound, the form of a free acid of which is represented by the following formula:

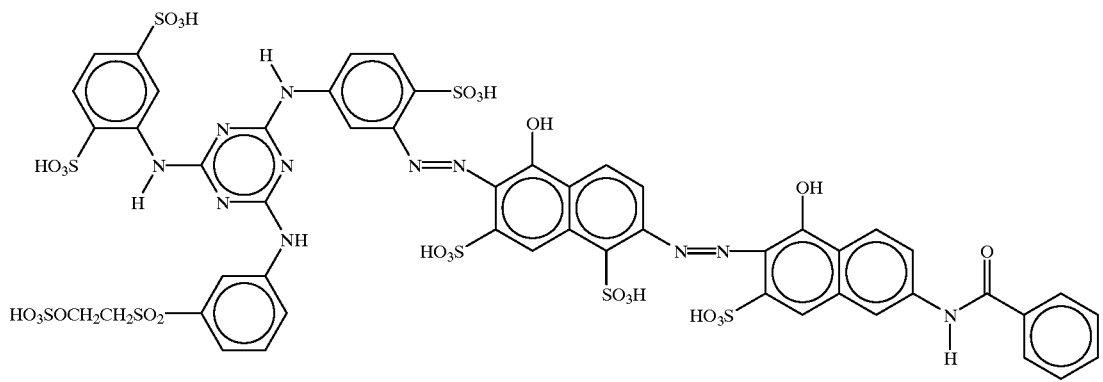

($\lambda$ max = 546 nm).

EXAMPLE 7

According to the same manner as that described in Example 6 except for using a compound of the column 2, a compound of the column 3, a compound of the column 4, a compound of the column 5, a compound of the column 6 and a compound of the column 7 shown in Table 3 in place of 7-amino-4-hydroxynaphthalene-2-sulfonic acid, benzoyl chloride, 2,5-disulfoaniline, 4-sulfo-1,3-diaminobenzene, 7-amino-4-hydroxynaphthalene-2,8-disulfonic acid and 3-(2-sulfate ethylsulfonyl)aniline used in Example 6, respectively, each corresponding polyazo compound was obtained. Using the polyazo compound thus obtained, dyeing was carried out and a dyed product having a color shown in the column 8 of Table 3 was obtained.

TABLE 3

| Column 1 | Column 2 | Column 3 | Column 4 | Column 5 | Column 6 | Column 7 | Column 8 |
|---|---|---|---|---|---|---|---|
| 3 | 1a | 6j | 3a | 8d | 1b | 4a | red |

EXAMPLE 8

According to the same manner as that described in Example 6 except for using a compound of the column 2, a compound of the column 3, a compound of the column 4, a compound of the column 5, a compound of the column 6 and a compound of the column 7 shown in Table 4 in place of 7-amino-4-hydroxynaphthalene-2-sulfonic acid, benzoyl chloride, 2,5-disulfoaniline, 4-sulfo-1,3-diaminobenzene, 7-amino-4-hydroxynaphthalene-2,8-disulfonic acid and 3-(2-sulfate ethylsulfonyl)aniline used in Example6, respectively, each corresponding polyazo compound is obtained.

TABLE 4

| Column 1 | Column 2 | Column 3 | Column 4 | Column 5 | Column 6 | Column 7 |
|---|---|---|---|---|---|---|
| 1 | 1a | 6h | 3a | 8d | 1b | 4a |
| 2 | 1a | 6i | 3a | 8d | 1b | 4a |
| 4 | 1a | 6k | 3a | 8d | 1b | 4e |
| 5 | 1a | 6m | 3a | 8d | 1b | 4a |
| 6 | 1a | 6n | 3a | 8d | 1b | 4a |
| 7 | 1a | 6j | 3a | 8d | 1d | 4a |

TABLE 4-continued

| Column 1 | Column 2 | Column 3 | Column 4 | Column 5 | Column 6 | Column 7 |
|---|---|---|---|---|---|---|
| 8  | 1a | 4x | 3b | 8d | 1b | 4a |
| 9  | 1a | 6b | 3b | 8d | 1b | 4e |
| 10 | 1a | 6c | 3b | 8d | 1b | 4a |
| 11 | 1a | 6d | 3b | 8d | 1b | 4a |
| 12 | 1a | 6e | 3b | 8d | 1b | 4a |
| 13 | 1a | 6f | 3b | 8d | 1b | 4a |
| 14 | 1a | 6g | 3b | 8d | 1b | 4a |
| 15 | 1a | 6b | 3c | 8d | 1b | 5a |
| 16 | 1g | 6i | 3c | 8d | 1b | 5c |
| 17 | 1g | 6i | 3c | 8d | 1b | 4t |
| 18 | 1a | 6j | 3c | 8d | 1b | 4s |
| 19 | 1a | 6j | 3c | 8d | 1b | 5a |
| 20 | 1a | 6k | 3c | 8d | 1b | 5a |
| 21 | 1a | 6k | 3c | 8d | 1b | 4s |
| 22 | 1a | 6j | 3c | 8d | 1b | 4a |
| 23 | 1a | 6j | 3c | 8d | 1b | 5l |
| 24 | 1a | 6j | 3c | 8d | 1e | 5b |
| 25 | 1a | 6j | 3c | 8d | 1e | 5b |
| 26 | 1a | 6j | 5q | 8d | 1b | 4a |
| 27 | 1a | 6j | 8d | 4a | 1b | 4s |
| 28 | 1a | 6k | 8d | 4a | 1b | 4s |
| 29 | 1a | 6l | 8d | 4a | 1b | 5b |
| 30 | 1a | 6j | 8d | 5r | 1b | 4a |
| 31 | 1f | 6j | 8d | 5r | 1b | 4a |
| 32 | 1a | 6k | 8d | 5r | 1b | 4a |
| 33 | 1a | 6b | 8d | 5s | 1b | 4a |
| 34 | 1a | 6b | 8d | 5t | 1b | 4e |
| 35 | 1a | 6j | 8d | 5t | 1b | 4a |

EXAMPLE 9

In an aqueous solvent, 31.9 parts of 5-amino-4-hydroxynaphthalene-2,7-disulfonic acid was condensed with 18.4 parts of 2,4,6-trichloro-s-triazine according to a normal method and the resultant condensate was condensed with 28.1 parts of 3-(2-sulfate ethylsulfonyl)aniline according to a normal method to obtain a naphthol derivative.

In an aqueous solvent, 41.1 parts of 6-(2-sulfate etylsulfonyl)-1-sulfo-2-aminonaphthalene was diazotized by using sodium nitrite, the diazotized product was diazo-coupled with 31.9 parts of 7-amino-4-hydroxynaphthalene-2,8-disulfonic acid to obtain a monoazo compound. This monoazo compound was diazotized by using sodium nitrite and then diazo-coupled with the above naphthol derivative to obtain a compound, the form of a free acid of which is represented by the following formula:

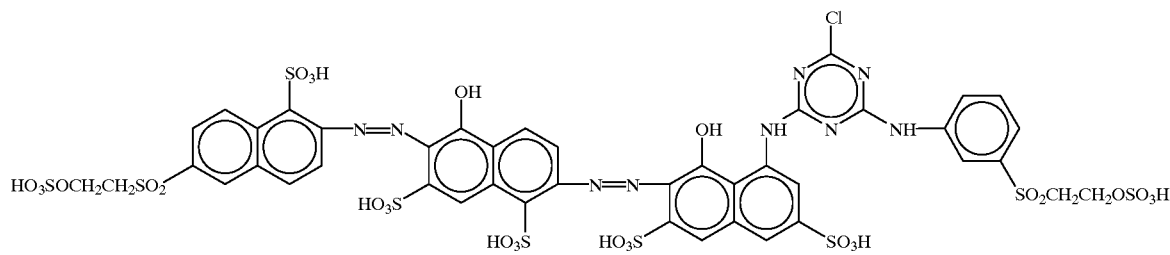

(λ max = 574 nm).

EXAMPLE 10

According to the same manner as that described in Example 9 except for using a compound of the column 2, a compound of the column 3, a compound of the column 4, a compound of the column 5 and a compound of the column 6 shown in Table 5 in place of 5-amino-4-hydroxynaphthalene-2,7-disulfonic acid, 2,4,6-trichloro-s-triazine, 3-(2-sulfate ethylsulfonyl)aniline, 6-(2-sulfate etylsulfonyl)-1-sulfo-2-aminonaphthalene and 7-amino-4-hydroxynaphthalene-2,8-disulfonic acid used in Example 9, respectively, each corresponding polyazo compound was obtained. Using the polyazo compound thus obtained, dyeing was carried out and a dyed product having a color shown in the column 8 of Table 5 was obtained.

TABLE 5

| Column 1 | Column 2 | Column 3 | Column 4 | Column 5 | Column 6 | Column 7 |
|---|---|---|---|---|---|---|
| 19 | 1a | 4x | 4e | 4p | 1b | bluish red |

EXAMPLE 11

According to the same manner as that described in Example 9 except for using a compound of the column 2, a compound of the column 3, a compound of the column 4, a compound of the column S and a compound of the column 6 shown in Table 6 in place of 5-amino-4-hydroxynaphthalene-2,7-disulfonic acid, 2,4,6-trichloro-s-triazine, 3-(2-sulfate ethylsulfonyl)aniline, 6-(2-sulfate etylsulfonyl)-1-sulfo-2-aminonaphthalene and 7-amino-4-hydroxynaphthalene-2,8-disulfonic acid used in Example 9, respectively, each corresponding polyazo compound is obtained.

TABLE 6

| Column 1 | Column 2 | Column 3 | Column 4 | Column 5 | Column 6 |
|---|---|---|---|---|---|
| 1  | 1a | 4x | 4a | 4i | 1b |
| 7  | 3c | 4x | 1a | 4i | 1b |
| 8  | 3c | 4x | 1a | 4i | 1e |
| 9  | 4e | 4x | 1a | 4i | 1b |
| 10 | 3c | 4x | 1a | 4k | 1b |
| 11 | 1a | 4x | 4v | 4m | 1b |
| 12 | 3c | 4x | 1a | 4m | 1b |
| 13 | 1g | 4x | 4e | 4o | 1b |
| 17 | 3c | 4x | 1g | 4o | 1b |
| 28 | 1h | 4x | 4e | 4p | 1b |
| 30 | 3c | 4x | 1a | 4p | 1b |
| 33 | 3c | 4x | 1a | 4r | 1b |

EXAMPLE 12

In an aqueous solvent, 31.9 parts of 5-amino-4-hydroxynaphthalene-2,7-disulfonic acid was condensed with 18.4 parts of 2,4,6-trichloro-s-triazine according to a normal method and the resultant condensate was condensed with 28.1 parts of 3-(2-sulfate ethylsulfonyl)aniline according to a normal method. The product thus obtained was condensed with 9.3 parts of aniline according to a normal method to obtain a naphthol derivative.

In an aqueous solvent, 41.1 parts of 6-(2-sulfate etylsulfonyl)-1-sulfo-2-aminonaphthalene was diazotized by using sodium nitrite, the diazotized product was diazo-coupled with 31.9 parts of 7-amino-4-hydroxynaphthalene-2,8-disulfonic acid to obtain a monoazo compound. This monoazo compound was diazotized by using sodium nitrite and then diazo-coupled with the above naphthol derivative to obtain a compound, the form of a free acid of which is represented by the following formula:

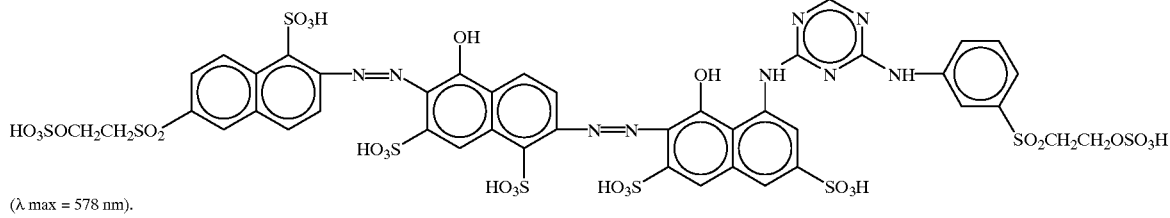

(λ max = 578 nm).

EXAMPLE 13

According to the same manner as that described in Example 12 except for using a compound of the column 2, a compound of the column 3, a compound of the column 4, a compound of the column 5 and a compound of the column 6 shown in Table 7 in place of 5-amino-4-hydroxynaphthalene-2,7-disulfonic acid, 3-(2-sulfate ethylsulfonyl)aniline, aniline, 6-(2-sulfate etylsulfonyl)-1-sulfo-2-aminonaphthalene and 7-amino-4-hydroxynaphthalene-2,8-disulfonic acid used in Example 12, respectively, each corresponding polyazo compound is obtained.

TABLE 7

| Column 1 | Column 2 | Column 3 | Column 4 | Column 5 | Column 6 |
|---|---|---|---|---|---|
| 1  | 3a | 1a | 4a | 4i | 1b |
| 4  | 3c | 1a | 4t | 4i | 1b |
| 5  | 3c | 1a | 5a | 4i | 1b |
| 7  | 1a | 5r | 4a | 4j | 1b |
| 8  | 3a | 1a | 4a | 4j | 1e |
| 9  | 3a | 1a | 4a | 4j | 1d |
| 10 | 3b | 1a | 4a | 4j | 1b |
| 11 | 3b | 1a | 4a | 4j | 1a |
| 12 | 3c | 1a | 5a | 4j | 1b |
| 15 | 1a | 4d | 5a | 4p | 1b |
| 16 | 1a | 5r | 4a | 4p | 1b |
| 19 | 1a | 5t | 4a | 4p | 1b |
| 21 | 3c | 1a | 5b | 4p | 1b |
| 22 | 3c | 1a | 5k | 4p | 1b |
| 23 | 3o | 1a | 4a | 4p | 1b |
| 24 | 3c | 1g | 4a | 4p | 1b |
| 25 | 3c | 1g | 5e | 4p | 1b |

EXAMPLE 14

In an aqueous solvent, 31.9 parts of 5-amino-4-hydroxynaphthalene-2, 7-disulfonic acid was condensed with 18.4 parts of 2,4,6-trichloro-s-triazine according to a normal method and the resultant condensate was condensed with 28.1 parts of 3-(2-sulfate ethylsulfonyl)aniline according to a normal method to obtain a compound, the free acid form of which being represented by the following formula (21):

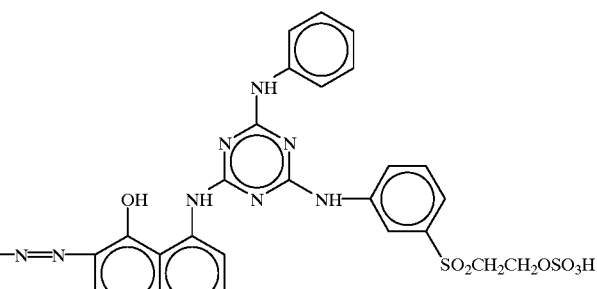

(21)

In an aqueous solvent, 58.3 parts of a compound, the free acid form of which being represented by the following formula (22):

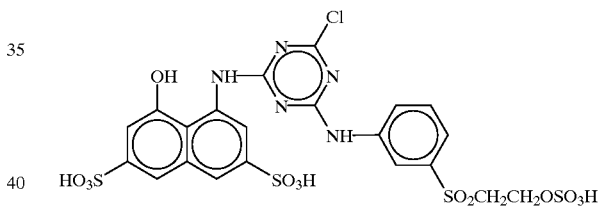

(22)

was diazotized by using sodium nitrite and the diazotized product was diazo-coupled with the above-obtained compound (21) to obtain a compound, the form of a free acid of which is represented by the following formula:

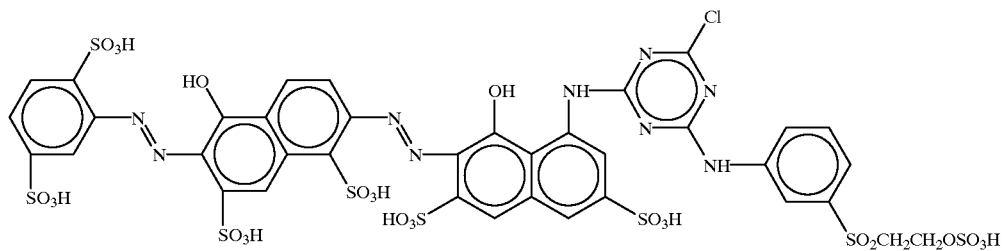

(λ max = 568 nm).

EXAMPLE 15

According to the same manner as that described in Example 14 except for using a compound of the column 2, a compound of the column 3, a compound of the column 4 and a compound of the column 5 shown in Table 8 in place of the compound of formula (22), 5-amino-4-hydroxynaphthalene-2,7-disulfonic acid, 3-(2-sulfate ethylsulfonyl)aniline and 2,4,6-trichloro-s-triazine used in Example 14, respectively, each corresponding polyazo compound was obtained. Using the polyazo compound thus obtained, dyeing was carried out and a dyed product having a color shown in the column 6 of Table 8 was obtained.

TABLE 8

| Column 1 | Column 2 | Column 3 | Column 4 | Column 5 | Column 6 |
|---|---|---|---|---|---|
| 1 | 2a | 1a | 4a | 4x | yellowish red |
| 2 | 2a | 1f | 4c | 4x | purple |
| 4 | 2a | 3c | 1a | 4x | yellowish red |
| 15 | 2e | 3d | 1a | 4x | yellowish red |
| 42 | 2p | 1a | 4a | 4x | red |

EXAMPLE 16

According to the same manner as that described in Example 14 except for using a compound of the column 2, a compound of the column 3, a compound of the column 4 and a compound of the column 5 shown in Table 9 in place of the compound of formula (22), 5-amino-4-hydroxynaphthalene-2,7-disulfonic acid, 3-(2-sulfate ethylsulfonyl)aniline and 2,4,6-trichloro-s-triazine used in Example 14, respectively, each corresponding polyazo compound is obtained.

TABLE 9

| Column 1 | Column 2 | Column 3 | Column 4 | Column 5 |
|---|---|---|---|---|
| 5 | 2a | 1c | 4e | 4x |
| 8 | 2b | 1b | 4a | 4x |
| 9 | 2b | 3g | 1a | 4x |
| 10 | 2c | 1h | 4m | 4x |
| 11 | 2c | 1a | 4d | 4x |
| 12 | 2d | 1b | 4g | 4x |
| 13 | 2d | 1f | 4i | 4x |
| 14 | 2e | 1a | 4h | 4x |
| 16 | 2f | 1a | 4n | 4x |
| 17 | 2f | 1g | 4f | 4x |
| 18 | 2g | 1b | 4j | 4x |
| 19 | 2g | 3e | 1a | 4x |
| 20 | 2h | 3h | 1a | 4x |
| 21 | 2h | 1e | 4o | 4x |

TABLE 9-continued

| Column 1 | Column 2 | Column 3 | Column 4 | Column 5 |
|---|---|---|---|---|
| 22 | 2i | 1c | 4q | 4x |
| 23 | 2i | 1b | 4p | 4x |
| 24 | 2j | 1a | 4a | 4x |
| 25 | 2j | 1b | 4a | 4x |
| 26 | 2j | 1d | 4e | 4x |
| 27 | 2j | 3c | 1a | 4x |
| 28 | 2j | 1a | 4a | 4y |
| 29 | 2j | 3c | 1a | 4y |
| 30 | 2j | 1a | 3i | 4y |
| 32 | 2k | 1e | 4r | 4x |
| 33 | 2k | 1b | 4n | 4x |
| 34 | 2l | 1d | 4a | 4x |
| 35 | 2l | 1e | 4b | 4x |
| 36 | 2m | 1a | 4r | 4x |
| 37 | 2m | 1b | 4c | 4x |
| 38 | 2n | 1a | 4v | 4x |
| 39 | 2n | 1c | 4a | 4x |
| 40 | 2o | 1d | 4k | 4x |
| 41 | 2o | 1e | 4o | 4x |
| 43 | 2p | 1b | 4g | 4x |
| 44 | 2p | 1a | 4w | 4x |
| 45 | 2p | 1c | 4a | 4x |
| 46 | 2p | 3c | 1a | 4x |
| 47 | 2p | 1a | 3f | 4y |
| 48 | 2p | 1a | 3h | 4y |
| 49 | 2p | 1c | 4a | 4y |
| 51 | 2q | 1a | 4l | 4x |
| 52 | 2q | 1d | 1a | 4x |
| 54 | 2r | 1b | 4v | 4x |
| 55 | 2s | 1a | 4k | 4x |
| 56 | 2s | 1c | 4a | 4x |
| 57 | 2t | 1a | 4a | 4x |
| 58 | 2t | 3d | 1a | 4x |

EXAMPLE 17

In an aqueous solvent, 31.9 parts of 5-amino-4-hydroxynaphthalene-2,7-disulfonic acid was condensed with 18.4 parts of 2,4,6-trichloro-s-triazine and the resultant condensate was condensed with 28.1 parts of 3-(2-sulfate ethylsulfonyl)aniline to obtain a compound, the free acid form of which being represented by the following formula (21):

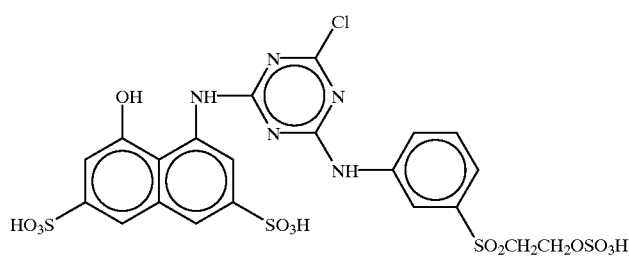

(21)

In an aqueous solvent, 50.3 parts of a compound, the free acid form of which being represented by the following formula (23):

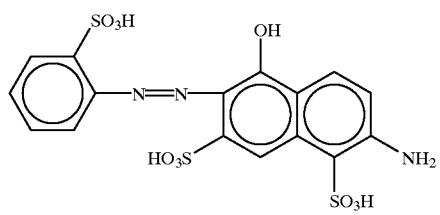

(23)

was diazotized by using sodium nitrite and the diazotized product was diazo-coupled with the above-obtained compound (21) in an aqueous solvent to obtain a compound, the form of a free acid of which is represented by the following formula:

EXAMPLE 18

According to the same manner as that described in Example 17 except for using a compound of the column 2, a compound of the column 3, a compound of the column 4 and a compound of the column 5 shown in Table 10 in place of the compound of formula (23), 5-amino-4-hydroxynaphthalene-2,7-disulfonic acid, 3-(2-sulfate ethylsulfonyl)aniline and 3-sulfoaniline used in Example 17, respectively, each corresponding polyazo compound was obtained. Using the polyazo compound thus obtained, dyeing was carried out and a dyed product having a color shown in the column 6 of Table 10 was obtained.

TABLE 10

| Column 1 | Column 2 | Column 3 | Column 4 | Column 5 | Column 6 |
|---|---|---|---|---|---|
| 1 | 2a | 1a | 4a | 5a | yellowish red |

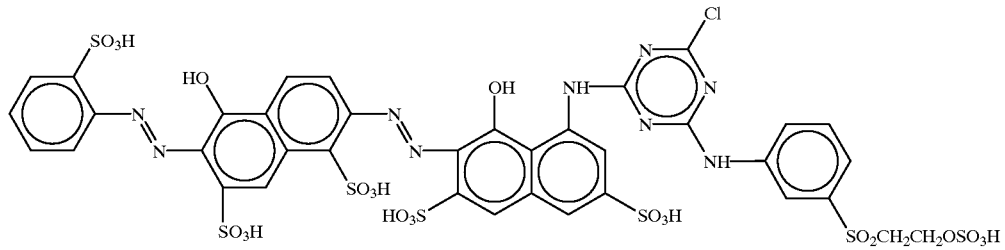

Thereafter, the compound thus obtained was reacted with 17.3 parts of 3-sulfoaniline in an aqueous solvent to obtain a compound, the form of a free acid of which is represented by the following formula:

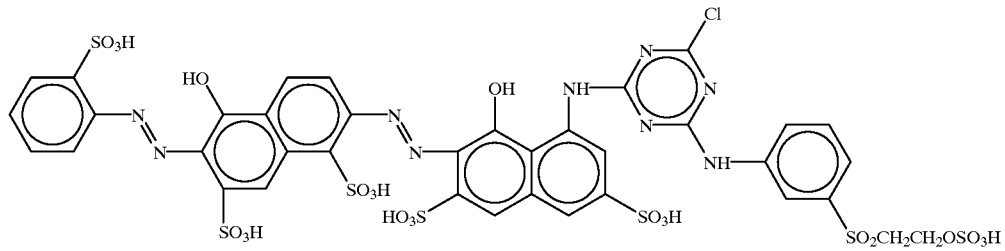

($\lambda$ max = 576 nm).

TABLE 10-continued

| Column 1 | Column 2 | Column 3 | Column 4 | Column 5 | Column 6 |
|---|---|---|---|---|---|
| 2 | 2a | 1a | 4a | 5u | yellowish red |
| 5 | 2a | 3a | 1a | 4a | yellowish red |
| 6 | 2a | 3a | 1a | 4e | yellowish red |
| 7 | 2a | 3c | 1a | 5a | yellowish red |
| 8 | 2a | 3c | 1a | 5j | yellowish red |
| 13 | 2a | 1f | 4a | 5u | purple |
| 14 | 2a | 1g | 4a | 5u | purple |

EXAMPLE 19

According to the same manner as that described in Example 17 except for using a compound of the column 2, a compound of the column 3, a compound of the column 4 and a compound of the column 5 shown in Table 11 in place of the compound of formula (23), 5-amino-4-hydroxynaphthalene-2,7-disulfonic acid, 3-(2-sulfate ethylsulfonyl)aniline and 3-sulfoaniline used in Example 17, respectively, each corresponding polyazo compound is obtained.

TABLE 11

| Column 1 | Column 2 | Column 3 | Column 4 | Column 5 |
|---|---|---|---|---|
| 3 | 2a | 1a | 4e | 4a |
| 4 | 2a | 1a | 4v | 4a |
| 9 | 2a | 3o | 1e | 5u |
| 10 | 2a | 3c | 1a | 5k |
| 11 | 2a | 3c | 1a | 4a |
| 12 | 2a | 3c | 1a | 4e |
| 15 | 2b | 1a | 4e | 5d |
| 16 | 2b | 1c | 4a | 5c |
| 17 | 2c | 1b | 5r | 4a |
| 18 | 2c | 1a | 4a | 5g |
| 19 | 2d | 1a | 5i | 4a |
| 20 | 2d | 3c | 1a | 5l |
| 21 | 2e | 3l | 1a | 5b |
| 22 | 2e | 2a | 4a | 5a |
| 23 | 2g | 1a | 4a | 5e |
| 24 | 2g | 1a | 4e | 4s |
| 25 | 2j | 1a | 4a | 5a |
| 26 | 2j | 1a | 4a | 4t |
| 27 | 2j | 1a | 4a | 4s |
| 28 | 2j | 1a | 5h | 4a |
| 29 | 2j | 3a | 1a | 4a |
| 30 | 2j | 3b | 1a | 4a |
| 31 | 2j | 3c | 1a | 5e |
| 32 | 2j | 3c | 1a | 5f |
| 33 | 2j | 3c | 1a | 5k |
| 34 | 2j | 3c | 1a | 5l |
| 35 | 2j | 3c | 1a | 4s |
| 36 | 2j | 3k | 1a | 4a |
| 37 | 2k | 1d | 4a | 5k |
| 38 | 2k | 1e | 4a | 4u |
| 39 | 2l | 3c | 1d | 5b |
| 40 | 2l | 1e | 5p | 4a |
| 41 | 2p | 1a | 4e | 4a |
| 42 | 2p | 1a | 4v | 4a |
| 43 | 2p | 1a | 4a | 4s |
| 44 | 2p | 1a | 4a | 6m |
| 45 | 2p | 3c | 1a | 4a |
| 46 | 2p | 3c | 1a | 5o |
| 47 | 2p | 3c | 1a | 5t |
| 48 | 2p | 3c | 1a | 5q |
| 49 | 2q | 1a | 4a | 5s |
| 50 | 2q | 3c | 1a | 5u |
| 51 | 2r | 1a | 4a | 5p |
| 52 | 2r | 3b | 1a | 4a |
| 53 | 2r | 1a | 4v | 6u |
| 54 | 2r | 1a | 5e | 4e |
| 55 | 2t | 1b | 4a | 5a |
| 56 | 2t | 3c | 1a | 5u |

EXAMPLE 20

In an aqueous solvent, 23.9 parts of 7-amino-4-hydroxynaphthalene-2-sulfonic acid is condensed with 14.1 parts of benzoyl chloride according to a normal method to obtain a naphthol derivative.

In an aqueous solvent, 18.8 parts of 4-sulfo-1,3-diaminobenzene is condensed with 18.4 parts of 2,4,6-trichloro-s-triazine according to a normal method and the resultant condensate is condensed with 28.1 parts of 3-(2-sulfate ethylsulfonyl)aniline according to a normal method. The product thus obtained is diazotized by using sodium nitrite, the diazotized product is diazo-coupled with 31.9 parts of 7-amino-4-hydroxynaphthalene-2,8-disulfonic acid (a) to obtain a monoazo compound. This monoazo compound is further diazotized by using sodium nitrite and then diazo-coupled with 31.9 parts of 7-amino-4-hydroxynaphthalene-2,8-disulfonic acid(b) to obtain a bisazo compound. This bisazo compound is further diazotized by using sodium nitrite and then diazo-coupled with the above naphthol derivative to obtain a compound, the form of a free acid of which is represented by the following formula:

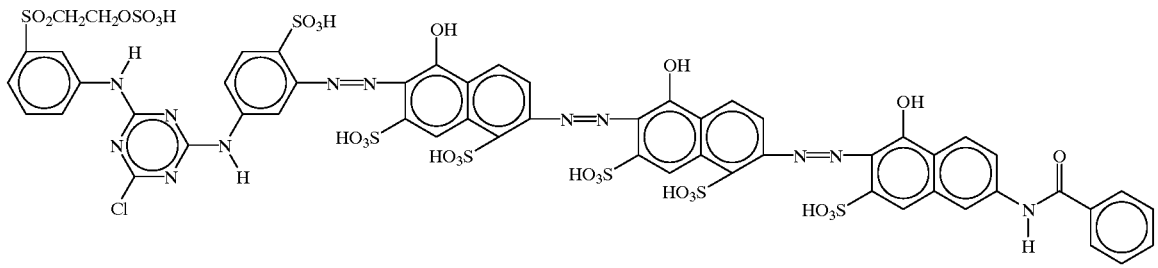

EXAMPLE 21

According to the same manner as that described in Example 20 except for using a compound of the column 2, a compound of the column 3, a compound of the column 4, a compound of the column 5, a compound of the column 6, a compound of the column 7 and a compound of the column 8 shown in Table 12 in place of 7-amino-4-hydroxynaphthalene-2-sulfonic acid, benzoyl chloride, 4-sulfo-1,3-diaminobenzene, 2,4,6-trichloro-s-triazine, 3(2-sulfate ethylsulfonyl) aniline, 7-amino-4-hydroxynaphthalene-2,8-disulfonic acid (a) and 7-amino-4-hydroxynaphthalene-2,8-disulfonic acid (b) used in Example 20, respectively, each corresponding polyazo compound is obtained.

TABLE 12

| Column 1 | Column 2 | Column 3 | Column 4 | Column 5 | Column 6 | Column 7 | Column 8 |
|---|---|---|---|---|---|---|---|
| 3 | 1a | 6b | 3a | 4x | 8d | 1b | 1b |
| 4 | 1a | 6c | 3a | 4x | 8d | 1b | 1b |
| 5 | 1a | 8d | 8d | 4x | 4a | 1b | 1b |
| 6 | 1a | 6e | 8d | 4x | 4a | 1b | 1b |
| 7 | 1a | 6f | 3a | 4x | 8d | 1b | 1b |
| 8 | 1a | 6g | 3a | 4x | 8d | 1b | 1b |
| 9 | 1a | 6h | 3a | 4x | 8d | 1b | 1b |
| 10 | 1g | 8h | 3c | 4x | 8d | 1b | 1b |
| 11 | 1g | 5h | 8d | 4x | 4b | 1b | 1b |
| 12 | 1g | 6h | 8d | 4x | 8d | 1b | 1e |
| 13 | 1a | 6i | 3c | 4x | 8d | 1b | 1b |
| 14 | 1g | 6j | 3c | 4x | 8d | 1b | 1b |
| 15 | 1g | 8j | 8d | 4x | 4a | 1b | 1b |
| 16 | 1g | 6j | 8d | 4x | 4e | 1b | 1b |
| 17 | 1h | 6j | 8d | 4x | 4e | 1b | 1b |
| 18 | 1g | 6k | 8d | 4x | 4e | 1b | 1b |
| 19 | 1a | 6l | 8d | 4x | 4a | 1b | 1b |
| 20 | 1a | 6m | 8d | 4x | 4e | 1b | 1b |
| 21 | 1a | 6n | 8d | 4x | 4e | 1b | 1b |
| 22 | 1g | 6i | 4e | 4y | 8d | 1b | 1b |
| 23 | 1a | 6j | 4e | 4y | 8d | 1b | 1b |

EXAMPLE 22

In an aqueous solvent, 23.9 parts of 7-amino-4-hydroxynaphthalene-2-sulfonic acid was condensed with 18.4 parts of 2,4,6-trichloro-s-triazine according to a normal method and the resultant condensate was condensed with 28.1 parts of 4-(2-sulfate ethylsulfonyl)aniline according to a normal method to obtain a naphthol derivative.

In an aqueous solvent, 41.1 parts of 6-(2-sulfate etylsulfonyl)-1-sulfo-2-aminonaphthalene was diazotized by using sodium nitrite, the diazotized product was diazo-coupled with 31.9 parts of 7-amino-4-hydroxynaphthalene-2,8-disulfonic acid(c) to obtain a monoazo compound. This monoazo compound was diazotized by using sodium nitrite and then diazo-coupled with 31.9 parts of 7-amino-4-hydroxynaphthalene-2,8-disulfonic acid(d) to obtain a bisazo compound. This bisazo compound was diazotized by using sodium nitrite and then diazo-coupled with the above naphthol derivative to obtain a compound, the form of a free acid of which is represented by the following formula:

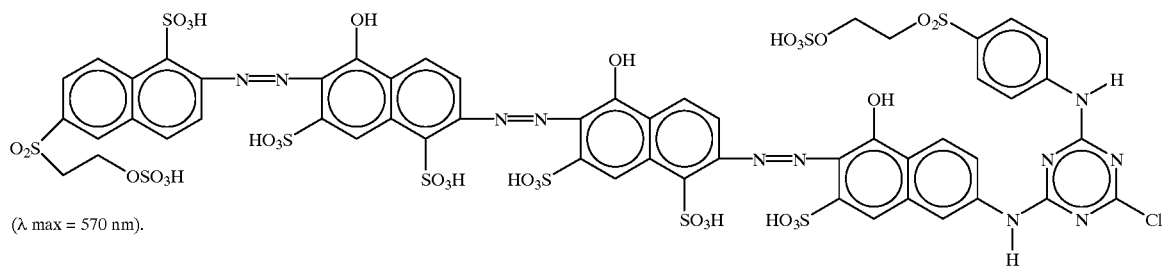

($\lambda$ max = 570 nm).

EXAMPLE 23

According to the same manner as that described in Example 22 except for using a compound of the column 2, a compound of the column 3, a compound of the column 4, a compound of the column 5, a compound of the column 6 and a compound of the column 7 shown in Table 13 in place of 7-amino-4-hydroxynaphthalene-2-sulfonic acid, 2,4,6-trichloro-s-triazine, 4-(2-sulfate ethylsulfonyl)aniline, 6-(2-sulfate etylsulfonyl)-1-sulfo-2-aminonaphthalene, 7-amino-4-hydroxynaphthalene-2,8-disulfonic acid(c) and 7-amino-4-hydroxynaphthalene-2 r8-disulfonic acid(d) used in Example 22, respectively, each corresponding polyazo compound was obtained. Using the polyazo compound thus obtained, dyeing was carried out and a dyed product having a color shown in the column 8 of Table 13 was obtained.

TABLE 13

| Column 1 | Column 2 | Column 3 | Column 4 | Column 5 | Column 6 | Column 7 | Column 8 |
|---|---|---|---|---|---|---|---|
| 1  | 1a | 4x | 4a | 4m | 1b | 1b | purple |
| 2  | 1a | 4x | 4a | 5j | 1b | 1b | purple |
| 3  | 1a | 4x | 4a | 5y | 1b | 1b | purple |
| 11 | 1g | 4x | 4a | 5j | 1b | 1b | purple |
| 13 | 1g | 4x | 4a | 5y | 1b | 1b | purple |

EXAMPLE 24

According to the same manner as that described in Example 22 except for using a compound of the column 2, a compound of the column 3, a compound of the column 4, a compound of the column 5, a compound of the column 6 and a compound of the column 7 shown in Table 14 in place of 7-amino-4-hydroxynaphthalene-2-sulfonic acid, 2,4,6-trichloro-s-triazine, 4-(2-sulfate ethylsulfonyl)aniline, 6-(2-sulfate etylsulfonyl)-1-sulfo-2-aminonaphthalene, 7-amino-4-hydroxynaphthalene-2,8-disulfonic acid(c) and 7-amino-4-hydroxynaphthalene-2,8-disulfonic acid(d) used in Example 22, respectively, each corresponding polyazo compound was obtained.

TABLE 14

| Column 1 | Column 2 | Column 3 | Column 4 | Column 5 | Column 6 | Column 7 |
|---|---|---|---|---|---|---|
| 4  | 1a | 4x | 4e | 5a | 1b | 1b |
| 5  | 1g | 4x | 4a | 4e | 1b | 1b |
| 6  | 1g | 4x | 4a | 4g | 1b | 1b |
| 7  | 1g | 4x | 4a | 4i | 1b | 1b |
| 8  | 1g | 4x | 4a | 4k | 1b | 1b |
| 9  | 1g | 4x | 4a | 4n | 1b | 1b |
| 10 | 1g | 4x | 4a | 5a | 1b | 1b |
| 12 | 1g | 4x | 4a | 5p | 1b | 1b |
| 14 | 1g | 4x | 4v | 5j | 1b | 1b |
| 15 | 1g | 4x | 4v | 5y | 1b | 1b |
| 21 | 3c | 4x | 1g | 4e | 1b | 1b |
| 22 | 3c | 4x | 1g | 4g | 1b | 1b |
| 23 | 3c | 4x | 1g | 4i | 1b | 1b |
| 24 | 3c | 4x | 1g | 4k | 1b | 1b |
| 25 | 3c | 4x | 1g | 4m | 1b | 1b |
| 26 | 3c | 4x | 1g | 5a | 1b | 1b |
| 27 | 3c | 4x | 1g | 5j | 1b | 1b |
| 28 | 3c | 4x | 1g | 5p | 1b | 1b |
| 29 | 3c | 4x | 1g | 5y | 1b | 1b |

EXAMPLE 25

In an aqueous solvent, 18.8 parts of 4-sulfo-1,3-diaminobenzene was condensed with 18.4 carts of 2,4,6-trichloro-s-triazine according to a normal method and the resultant condensate was condensed with 28.1 parts of 3-(2-sulfate ethylsulfonyl)aniline according to a normal method.

In an aqueous solvent, the compound thus obtained was diazotized by using sodium nitrite, the diazotized product was diazo-coupled with 31.9 parts of 7-amino-4-hydroxynaphthalene-2,8-disulfonic acid(e) to obtain a monoazo compound. This monoazo compound was diazotized by using sodium nitrite and then diazo-coupled with 31.9 parts of 7-amino-4-hydroxynaphthalene-2,8-disulfonic acid (f) to obtain a bisazo compound. This bisazo compound was diazotized by using sodium nitrite and then diazo-coupled with 30.4 parts of 3,6-disulfo-1-naphthol to obtain a compound, the form of a free acid of which is represented by the following formula:

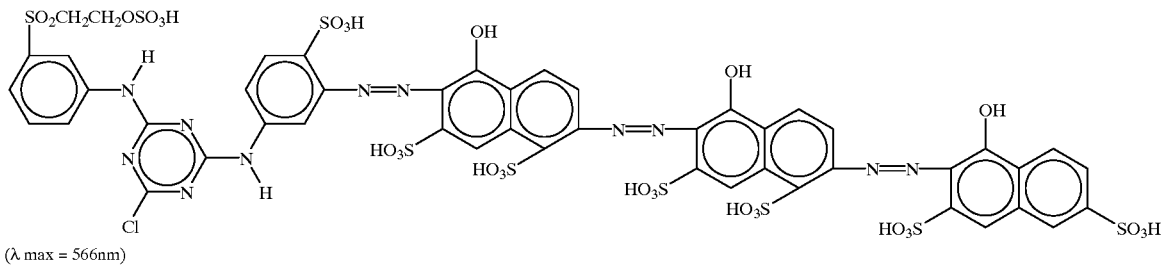

(λ max = 566nm)

EXAMPLE 26

According to the same manner as that described in Example 25 except for using a compound of the column 2, a compound of the column 3, a compound of the column 4, a compound of the column 5, a compound of the column 6 and a compound of the column 7 shown in Table 15 in place of 4-sulfo-1,3-diaminobenzene, 2,4,6-trichloro-s-triazine, 3-(2-sulfate ethylsulfonyl)aniline, 7-amino-4-hydroxynaphthalene-2,8-disulfonic acid(e), 7-amino-4-hydroxynaphthalene-2,8-disulfonic acid(f) and 3,6 -disulfo-1-naphthol used in Example 25, respectively, each corresponding polyazo compound was obtained.

TABLE 15

| Column 1 | Column 2 | Column 3 | Column 4 | Column 5 | Column 6 | Column 7 |
| --- | --- | --- | --- | --- | --- | --- |
| 3  | 3c | 4x | 8d | 1b | 1b | 7c |
| 5  | 3c | 4x | 8d | 1b | 1b | 7d |
| 6  | 8c | 4x | 4a | 1b | 1b | 7e |
| 7  | 8d | 4x | 4a | 1b | 1b | 7f |
| 13 | 8d | 4x | 4b | 1b | 1b | 7d |
| 14 | 8d | 4x | 4c | 1b | 1b | 7d |
| 15 | 8d | 4x | 4d | 1b | 1b | 7d |
| 16 | 8d | 4x | 4f | 1b | 1b | 7d |
| 17 | 8d | 4x | 4h | 1b | 1b | 7d |
| 18 | 8d | 4x | 4p | 1b | 1b | 7d |

EXAMPLE 27

According to the same manner as that described in Example 14 except for using above-mentioned compound 2a, 1a, 4a and 4x in place of the compound of formula (22), 5-amino-4-hydroxynaphthalene-2,7-disulfonic acid, 3-(2-sulfate ethylsulfonyl)aniline and 2,4,6-trichloro-s-triazine used in Example 14, respectively, each corresponding polyazo compound was obtained.

EXAMPLE 28

0.3 Part of bisazo compound obtained in Example 27 was dissolved separately in 200 parts of water. Then 20 parts of sodium sulfate and 10 parts of cotton were added to the solution and the solution was heated to 70° C. After 30 minutes at this temperature, 4 parts of sodium carbonate was added and dyeing was effected for an hour. Upon completion of dyeing, the product was subjected to rinsing and soaping to give an yellowish-red dyed product excellent in various fastness and having a good build-up properties.

EXAMPLE 29

Using compound obtained in Example 27, a color paste having the following composition was prepared:

| | |
| --- | --- |
| Bisazo compound | 5 parts |
| Urea | 5 parts |
| Sodium alginate | 50 parts |
| Hot water | 25 parts |
| Sodium hydrogen carbonate | 2 parts |
| Balance (water) | 13 parts |

The color paste was printed onto a mercerized cotton broad cloth, which was subjected to intermediate drying, rinsing with warm water, soaping, rinsing with warm water and drying to give an yellowish-red printed product excellent in various fastness.

What is claimed is:

1. A polyazo compound represented by the following formula (I):

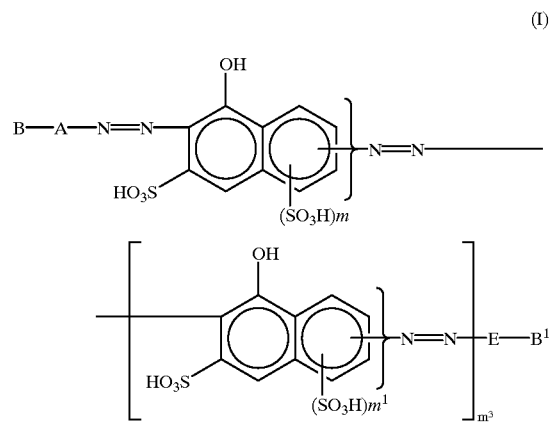

wherein

A represents unsubstituted phenylene, phenylene substituted with 1, 2 or 3 substituents selected from the group consisting of methyl, ethyl, methoxy, ethoxy, chloro, bromo, carboxy, nitro, acylamino having 1 to 4 carbon atoms, sulfo and a group represented by the following general formula (18) or (19):

$$—NHCOR^{18} \qquad (18)$$

$$—NHSO_2R^{18} \qquad (19)$$

wherein $R^{18}$ represents optionally substituted lower alkyl, optionally substituted phenyl or optionally substituted naphthyl, unsubstituted naphthylene or naphthylene substituted with 1, 2 or 3 sulfo groups;

E represents unsubstituted hydroxynaphthylene, or hydroxynaphthylene substituted with at least one non-reactive substitutent;

m, $m^1$ and $m^3$ independently represent an integer of 0 or 1;

B represents hydrogen atom, —$SO_2$-Z in which Z represents —CH=$CH_2$ or —$CH_2CH_2$Y in which Y represents a group eliminatable by an action of an alkali, or a group represented by the following formula (1), (2) or (3):

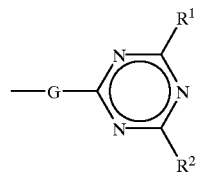

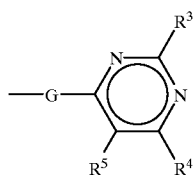
(2)

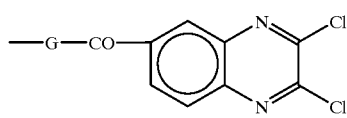
(3)

wherein
G represents a group represented by the following formula (4) or (5):

(4)

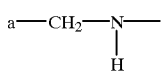
(5)

wherein
"a" represents to bond with A or E; and R represents hydrogen atom or optionally substituted lower alkyl;
$R^1$ represents a group represented by the following general formula (7), (8), (9) and (10):

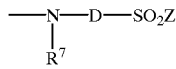
(7)

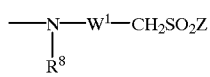
(8)

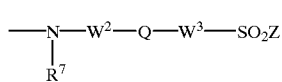
(9)

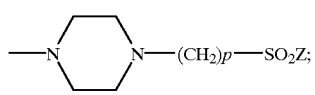
(10)

wherein
$R^7$ represents hydrogen atom or optionally substituted lower alkyl;

D represents optionally substituted phenylene or optionally substituted naphthylene;
Z represents the same definition as above;
$W^1$ represents optionally substituted straight-chain or branched lower alkylene;
$R^8$ represents hydrogen atom, optionally substituted lower alkyl or —$W^1$—$CH_2SO_2Z$ in which $W^1$ and Z represent the same definition as above;
$W^2$ and $W^3$ independently represent straight-chain or branched alkylene having 2 to 6 carbon atoms;
Q represents —O— or —$NR^9$ in which $R^9$ represents hydrogen atom or lower alkyl; and
p represents an integer of 1 to 6;
$R^2$, which is same as or different from $R^1$, represents fluorine atom; chlorine atom; optionally substituted amino; —$OR^{10}$ or —$SR^{10}$, in which $R^{10}$ represents hydrogen atom, optionally substituted lower alkyl or optionally substituted phenyl;
a group represented by the following formula (6):

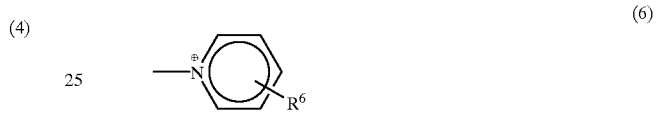
(6)

wherein
$R^6$ represents hydrogen atom, lower alkyl, carbamoyl or carboxyl;
or a group represented by the formula (7), (8), (9) or (10);
$R^3$ and $R^4$ independently represent fluorine atom, chlorine atom or hydrogen atom; and
$R^5$ represents hydrogen atom, fluorine atom, chlorine atom, cyano or lower alkyl; and
$B^1$, which is same as or different from B, represents hydrogen atom or a group represented by the formula (1), (2) or (3); provided that at least one of B and $B^1$ represents a group represented by the formula (1);
or a salt thereof.

2. The compound according to claim 1, wherein A is unsubstituted phenylene, phenylene substituted with 1, 2 or 3 substituents selected from the group consisting of methyl, ethyl, methoxy, ethoxy, chloro, bromo, carboxy, nitro, acylamino, sulfo and a group of formula (18) or (19),

—$NHCOR^{18}$ (18)

—$NHSO_2R^{18}$ (19)

wherein $R^{18}$ represents optionally substituted lower alkyl, optionally substituted phenyl or optionally substituted naphthyl; unsubstituted naphthylene or naphthylene substituted with 1, 2 or 3 sulfo groups.

3. The compound according to claim 1, wherein A is phenylene or naphthylene which has a substituent at the ortho-position relative to the bonding position of an azo group.

4. The compound according to claim 1, wherein E is hydroxynaphthylene substituted with substituents selected from 1, 2 or 3 sulfo groups and a group of the following general formula (18) or (19):

—$NHCOR^{10}$ (18)

—$NHSO_2R^{18}$ (19)

wherein R[18] represents optionally substituted lower alkyl, optionally substituted phenyl or optionally substituted naphthyl.

5. The compound according to claim 1, wherein B and/or B[1] represent a group of the formula (1) and R[2] is optionally substituted amino.

6. The compound according to claim 5, wherein the optionally substituted amino is represented by the following formula (16) or (17):

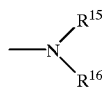
(16)

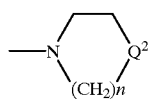
(17)

wherein

R[15] represents hydrogen atom, cyano or optionally substituted lower alkyl,

R[16] represents hydrogen atom, optionally substituted lower alkyl, optionally substituted phenyl, optionally substituted naphthyl or optionally substituted cycloalkyl having 5 to 7 carbon atoms in the cycloalkyl moiety, n represents 1 or 2, and $Q^2$ represents —O—, —S—, —CH$_2$, —SO$_2$— or —NR[17] in which R[17] represents hydrogen atom or lower alkyl.

7. The compound according to claim 1, wherein B and/or B[1] represent a group of the formula (1), R[1] is a group of the general formula (7), R[7] is hydrogen atom, methyl or ethyl, and D is unsubstituted phenylene, phenylene substituted with 1 or 2 substituents selected from the group consisting of methyl, methoxy and sulfo, unsubstituted naphthylene or naphtylene substituted with 1 or 2 sulfo groups.

8. The compound according to claim 7, wherein R[7] is hydrogen atom and D is phenylene.

9. The compound according to claim 1, wherein B and/or B[1] represent a group of the general formula (1), R[1] is a group of the general formula (8) defined in claim 1 and R[8] is hydrogen atom.

10. The compound according to claim 1, wherein the form of a free acid of Z in the formula (I) independently represent —CH=CH$_2$, —CH$_2$CH$_2$OSO$_3$H or —CH$_2$CH$_2$Cl.

11. A method for dyeing or textile-printing a fiber material, comprising applying the compound of claim 1 to a fiber material.

* * * * *